United States Patent
Holewinski et al.

(10) Patent No.: US 12,460,305 B2
(45) Date of Patent: Nov. 4, 2025

(54) ELECTROCHEMICAL SYNTHESIS OF HYDROXYVALERIC ACID FROM LEVULINIC ACID

(71) Applicant: The Regents of the University of Colorado, a body corporate, Denver, CO (US)

(72) Inventors: Adam Holewinski, Boulder, CO (US); Francisco Willian de Souza Lucas, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 69 days.

(21) Appl. No.: 18/501,126

(22) Filed: Nov. 3, 2023

(65) Prior Publication Data

US 2024/0158926 A1    May 16, 2024

Related U.S. Application Data

(60) Provisional application No. 63/422,065, filed on Nov. 3, 2022.

(51) Int. Cl.
C25B 3/07    (2021.01)
C25B 3/25    (2021.01)

(52) U.S. Cl.
CPC . *C25B 3/07* (2021.01); *C25B 3/25* (2021.01)

(58) Field of Classification Search
None
See application file for complete search history.

(56) References Cited

PUBLICATIONS

Bisselink, Roel JM, et al. "Identification of more benign cathode materials for the electrochemical reduction of levulinic acid to valeric acid." ChemElectroChem 6.13 (2019): 3285-3290.

Botte, Gerardine G. "Electrochemical manufacturing in the chemical industry." The Electrochemical Society Interface 23.3 (2014): 49-55.

Danilovic, N., et al. "The effect of noncovalent interactions on the HOR, ORR, and HER on Ru, Ir, and Ru 0.50 Ir 0.50 metal surfaces in alkaline environments." Electrocatalysis 3 (2012): 221-229.

Dos Santos, Tatiane R., et al. "Electrochemistry for the generation of renewable chemicals: electrochemical conversion of levulinic acid." Rsc Advances 5.34 (2015): 26634-26643.

(Continued)

*Primary Examiner* — Wojciech Haske
(74) *Attorney, Agent, or Firm* — Meunier Carlin & Curfman LLC

(57) ABSTRACT

Disclosed herein are methods of electrochemical synthesis of hydroxyvaleric acid from levulinic acid. For example, disclosed herein are methods comprising electrochemical synthesis of hydroxyvaleric acid from levulinic acid, wherein the method is conducted in an electrochemical cell wherein a working electrode is in electrochemical contact with an aqueous electrolyte and levulinic acid, wherein the method comprises applying a potential to electrochemically reduce the levulinic acid to form hydroxyvaleric acid. Also disclosed herein are methods of synthesizing gamma-valerolactone from hydroxyvaleric acid, the method comprising acid-catalyzed esterification. Also disclosed herein are methods of use of the products produced by any of the methods herein.

18 Claims, 21 Drawing Sheets

(56) References Cited

PUBLICATIONS

Du, Yan, et al. "Synthesis of valeric acid by selective electrocatalytic hydrogenation of biomass-derived levulinic acid." Catalysts 10.6 (2020): 692.

Frontana-Uribe, Bernardo A., et al. "Organic electrosynthesis: a promising green methodology in organic chemistry." Green Chemistry 12.12 (2010): 2099-2119.

Gabirondo, E., Sangroniz, A., Etxeberria, A., Torres-Giner, S., & Sardon, H. (2020). Poly(hydroxy acids) derived from the self-condensation of hydroxy acids: from polymerization to end-of-life options. Polymer Chemistry, 11(30), 4861-4874.

Saratale, Rijuta Ganesh, et al. "A comprehensive overview and recent advances on polyhydroxyalkanoates (PHA) production using various organic waste streams." Bioresource technology 325 (2021): 124685.

Hayes, Graham C., and C. Remzi Becer. "Levulinic acid: A sustainable platform chemical for novel polymer architectures." Polymer Chemistry 11.25 (2020): 4068-4077.

Koley, Paramita, et al. "One-pot conversion of levulinic acid into gamma-valerolactone over a stable Ru tungstosphosphoric acid catalyst." Fuel 289 (2021): 119900.

Zebardast, H. R., S. Rogak, and E. Asselin. "Potential of zero charge of glassy carbon at elevated temperatures." Journal of Electroanalytical Chemistry 724 (2014): 36-42.

Lucas, Francisco WS, et al. "Electrochemical routes for the valorization of biomass-derived feedstocks: from chemistry to application." ACS Energy Letters 6.4 (2021): 1205-1270.

Lucas, Francisco WS, and Fabio HB Lima. "Electrodeposited Tin-Antimony Alloys as Novel Electrocatalysts for Selective and Stable Carbon Dioxide Reduction to Formate." ChemElectroChem 7.18 (2020): 3733-3742.

Miyake, Hiroto, Shen Ye, and Masatoshi Osawa. "Electroless deposition of gold thin films on silicon for surface-enhanced infrared spectroelectrochemistry." Electrochemistry Communications 4.12 (2002): 973-977.

Nilges, Peter, and Uwe Schröder. "Electrochemistry for biofuel generation: production of furans by electrocatalytic hydrogenation of furfurals." Energy & Environmental Science 6.10 (2013): 2925-2931.

Pileidis, Filoklis D., and Maria-Magdalena Titirici. "Levulinic acid biorefineries: new challenges for efficient utilization of biomass." ChemSusChem 9.6 (2016): 562-582.

Qiu, Yang, et al. "Integrated electrocatalytic processing of levulinic acid and formic acid to produce biofuel intermediate valeric acid." Green Chemistry 16.3 (2014): 1305-1315.

Sathesh-Prabu, Chandran, and Sung Kuk Lee. "Engineering the Iva operon and optimization of Culture conditions for enhanced production of 4-hydroxyvalerate from levulinic acid in Pseudomonas putida KT2440." Journal of agricultural and food chemistry 67.9 (2019): 2540-2546.

Wu, Haoran, et al. "Surface engineering in PbS via partial oxidation: towards an advanced electrocatalyst for reduction of levulinic acid to γ-valerolactone." Chemical Science 10.6 (2019): 1754-1759.

Xin, Le, et al. "Electricity Storage in Biofuels: Selective Electrocatalytic Reduction of Levulinic Acid to Valeric Acid or γ-Valerolactone." ChemSusChem 6.4 (2013): 674-686.

Xu, Rui, et al. "Falling Leaves Return to Their Roots: A Review on the Preparation of γ-Valerolactone from Lignocellulose and its Application in the Conversion of Lignocellulose." ChemSusChem 13.24 (2020): 6461-6476.

Xu, Yufei, et al. "Catalytic Transfer Hydrogenation of Biomass-derived Levulinates to γ-valerolactone Using Alcohols as H-donors." Current Green Chemistry 7.3 (2020): 304-313.

Yeon, Young Joo, Hyung-Yeon Park, and Young Je Yoo. "Enzymatic reduction of levulinic acid by engineering the substrate specificity of 3-hydroxybutyrate dehydrogenase." Bioresource technology 134 (2013): 377-380.

Yeon, Young Joo, Hyung-Yeon Park, and Young Je Yoo. "Engineering substrate specificity of succinic semialdehyde reductase (AKR7A5) for efficient conversion of levulinic acid to 4-hydroxyvaleric acid." Journal of Biotechnology 210 (2015): 38-43.

ELECTROCHEMICAL SYNTHESIS OF HYDROXYVALERIC ACID FROM LEVULINIC ACID

CROSS-REFERENCE TO RELATED APPLICATIONS

This application claims the benefit of priority to U.S. Provisional Application No. 63/422,065 filed Nov. 3, 2022, which is hereby incorporated herein by reference in its entirety.

STATEMENT OF GOVERNMENT SUPPORT

This invention was made with government support under Grant No. 1665176 and CBET grant number 2004090 awarded by the National Science Foundation, and grant number UGA-0-41026-103 awarded by the National Renewable Energy Laboratory. The government has certain rights in the invention.

BACKGROUND

Levulinic acid (4-oxopentanoic acid, LA) has been identified as a highly versatile biomass-derived platform molecule. Levulinic acid is produced at industrial-scale via acid-catalyzed hydrolysis of lignocellulose and can be upgraded to several commodities and fine chemicals that are platforms for production of fuels and fuel-additives, polymers, herbicides and pesticides, pharmaceuticals and food additives, and other materials and products.

Selective routes to upgrading levulinic acid 4-hydroxyvaleric acid are desirable as this hydroxycarboxylic acid is a versatile compound that can be used as a monomer for production of biodegradable and biocompatible polyesters—poly(hydroxy acids), PHAs—as well as other diverse commodities, fine chemicals, pesticides, and pharmaceuticals. The methods discussed herein address these and other needs.

SUMMARY

In accordance with the purposes of the disclosed compositions, devices, methods, and systems as embodied and broadly described herein, the disclosed subject matter relates to electrochemical synthesis of hydroxyvaleric acid from levulinic acid.

For example, disclosed herein are methods comprising electrochemical synthesis of hydroxyvaleric acid from levulinic acid, wherein the method is conducted in an electrochemical cell wherein a working electrode is in electrochemical contact with an aqueous electrolyte and levulinic acid, wherein the method comprises applying a potential to electrochemically reduce the levulinic acid to form hydroxyvaleric acid.

In some examples, the working electrode comprises Pb, Sn, In, Bi, Cd, Zn, Sb, or a combination thereof. In some examples, the working electrode comprises Pb.

In some examples, the aqueous electrolyte has a pH of from 0 to 14, from 3 to 14, from 5 to 14, or from 5 to 10.

In some examples, the method is conducted at a temperature of from above freezing to below boiling, from 0° C. to 120° C., from 0° C. to 100° C., from 20° C. to 50° C.

In some examples, the levulinic acid has an initial concentration from greater than 0 to below the solubility limit, from greater than 0 to 0.4 mol/L.

In some examples, the aqueous electrolyte further comprises an additive, a solvent, or a combination thereof.

In some examples, the potential is from −1.1 to −1.9 V vs. RHE, or from −1.3 to −1.9 V vs. RHE.

In some examples, the method further comprises applying a current density of from 1 to 2000 mA cm$^{-2}$, or from 10 to 250 mA cm$^{-2}$.

In some examples, the potential is applied for an amount of time of 1 minute to 1000 minutes, or from 10 to 400 minutes.

In some examples, the method produces the hydroxyvaleric acid from the levulinic acid with a selectivity of from 50 to 100%, from 80 to 100%, or from 99 to 100%.

In some examples, the method produces the hydroxyvaleric acid from the levulinic acid with a Faradaic efficiency of from 50 to 100%, or from 80 to 100%.

In some examples, the method converts from greater than 0 to 100%, from 50 to 100%, or from 80 to 100% of the levulinic acid to the hydroxyvaleric acid.

In some examples, the method produces the hydroxyvaleric acid from the levulinic acid at a production rate of from 5 to 1000 g L$^{-1}$ h$^{-1}$, or from 5 to 50 g L$^{-1}$ h$^{-1}$.

In some examples, the method further synthesizes valeric acid, gamma-valerolactone, or a combination thereof from the levulinic acid.

In some examples, the method further comprises subsequently converting the electrochemically synthesized hydroxyvaleric acid to gamma-valerolactone, wherein the method comprises electrolysis of the levulinic acid followed by acid-catalyzed esterification to form the gamma-valerolactone. In some examples, the method: converts from 90% to 100% of the hydroxyvaleric acid to the gamma-valerolactone; produces the gamma-valerolactone from the hydroxyvaleric acid with a selectivity of from 90% to 100%; produces the gamma-valerolactone with a yield of from 90 to 100%; produces the gamma-valerolactone in an amount of time of from 1 to 120 minutes or from 5 to 30 minutes; or a combination thereof.

In some examples, the method is a one-pot method.

Also disclosed herein are methods of synthesizing gamma-valerolactone from hydroxyvaleric acid, the method comprising acid-catalyzed esterification.

Also disclosed herein are methods of use of the hydroxyvaleric acid produced by any of the methods herein, the method comprising using the hydroxyvaleric acid to make a biodegradable polymer, biocompatible polymer, or a combination thereof.

Additional advantages of the disclosed compositions, devices, systems, and methods will be set forth in part in the description which follows, and in part will be obvious from the description. The advantages of the disclosed compositions, devices, systems, and methods will be realized and attained by means of the elements and combinations particularly pointed out in the appended claims. It is to be understood that both the foregoing general description and the following detailed description are exemplary and explanatory only and are not restrictive of the disclosed compositions, devices, systems, and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
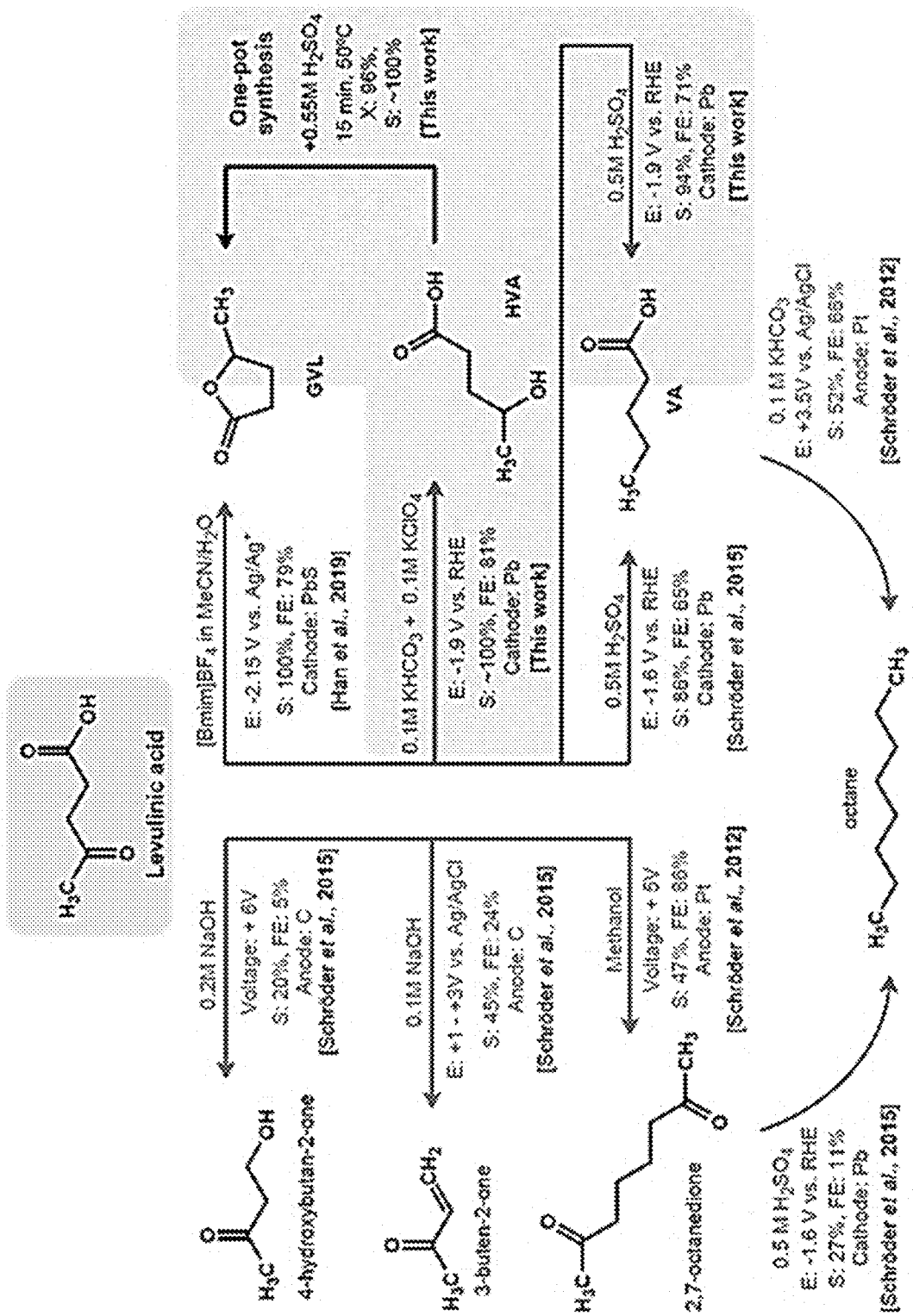
FIG. 1. Electrochemical routes for levulinic acid upgrading. Data from Han et al. [8], Schröder et al. [15,18], and this work. Abbreviations are E: potential, FE: faradaic efficiency, S: selectivity, X: conversion.

The compositions, devices, methods, and systems described herein may be understood more readily by reference to the following detailed description of specific aspects of the disclosed subject matter and the Examples included therein.

Before the present compositions, devices, methods, and systems are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

"Exemplary" means "an example of" and is not intended to convey an indication of a preferred or ideal embodiment. "Such as" is not used in a restrictive sense, but for explanatory purposes.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

The expressions "ambient temperature" and "room temperature" as used herein are understood in the art and refer generally to a temperature from 20° C. to 35° C.

Unless stated to the contrary, a formula with chemical bonds shown only as solid lines and not as wedges or dashed lines contemplates each possible stereoisomer or mixture of stereoisomer (e.g., each enantiomer, each diastereomer, each meso compound, a racemic mixture, or scalemic mixture).

Methods

Disclosed herein are methods comprising electrochemical synthesis of hydroxyvaleric acid from levulinic acid.

For example, the methods can be conducted in an electrochemical cell wherein a working electrode is in electrochemical contact with an aqueous electrolyte and levulinic acid, wherein the method comprises applying a potential to electrochemically reduce the levulinic acid to form hydroxyvaleric acid.

In some examples, the electrochemical cell comprises a cathodic compartment and an anodic compartment separated by an ion exchange membrane (e.g., a proton exchange membrane, an anion exchange membrane, etc.). In some examples, the electrochemical cell comprises a three-electrode H-type cell, the three-electrodes being the working electrode, a reference electrode, and an auxiliary electrode.

The working electrode can comprise any suitable electrode, such as those known in the art. For example, the working electrode can comprise an electrically conductive material. In some examples, the working electrode can comprise a metal. In some examples, the working electrode can comprise a metal selected from the group consisting of Be, Mg, Al, Ca, Sc, Ti, V, Cr, Mn, Fe, Co, Ni, Cu, Zn, Ga, Sr, Y, Zr, Nb, Mo, Tc, Ru, Rh, Pd, Ag, Cd, In, Sn, Ba, Hf, Ta, W, Re, Os, Ir, Pt, Au, Hg, Tl, Pb, Bi, La, Ce, Pr, Nd, Pm, Sm, Eu, Gd, Tb, Dy, Ho, Er, Tm, Yb, and combinations thereof. In some examples, the working electrode can comprise a metal selected from the group consisting of Bi, Al, Ti, Fe, Ni, Cu, Zn, Ga, Ag, Cd, In, Sn, Hg, Sb, Pb, and combinations thereof. In some examples, the working electrode comprises Pb, Sn, In, Bi, Cd, Zn, Sb, or a combination thereof. In some examples, the working electrode comprises Pb.

The aqueous electrolyte can comprise any suitable electrolyte, such as those known in the art. In some examples, the aqueous electrolyte can comprise an inorganic salt such as a metal hydroxide, phosphoric acid, sulfuric acid, or a combination thereof dissolved in water. In some examples, the aqueous electrolyte can comprise a lithium salt, a potassium salt, a sodium salt, a cesium salt, phosphoric acid, sulfuric acid, perchloric acid, or a combination thereof dissolved in water. In some examples, the aqueous electrolyte can comprise water and $H_2SO_4$, $KClO_4$, $HClO_4$, potassium acetate buffer, $KHCO_3$, $K_2CO_3$, KOH, $LiHCO_3$, $LiClO_4$, $NaHCO_3$, $NaClO_4$, $CsHCO_3$, $CsClO_4$, or a combination thereof.

In some examples, the aqueous electrolyte can have a pH of 0 or more (e.g., 0.5 or more, 1 or more, 1.5 or more, 2 or more, 2.5 or more, 3 or more, 3.5 or more, 4 or more, 4.5 or more, 5 or more, 5.5 or more, 6 or more, 6.5 or more, 7 or more, 7.5 or more, 8 or more, 8.5 or more, 9 or more, 9.5 or more, 10 or more, 10.5 or more, 11 or more, 11.5 or more, 12 or more, 12.5 or more, or 13 or more). In some examples, the aqueous electrolyte can have a pH or 14 or less (e.g., 13.5 or less, 13 or less, 12.5 or less, 12 or less, 11.5 or less, 11 or less, 10.5 or less, 10 or less, 9.5 or less, 9 or less, 8.5 or less, 8 or less, 7.5 or less, 7 or less, 6.5 or less, 6 or less, 5.5 or less, 5 or less, 4.5 or less, 4 or less, 3.5 or less, 3 or less, 2.5 or less, 2 or less, 1.5 or less, or 1 or less). The pH of the aqueous electrolyte can range from any of the minimum values described above to any of the maximum values described above. For example, the aqueous electrolyte can have a pH of from 0 to 14 (e.g., from 0 to 7, from 7 to 14, from 0 to 3, from 3 to 6, from 6 to 9, from 9 to 14, from 0 to 12, from 0 to 10, from 3 to 14, from 5 to 14, from 7 to 14, from 3 to 12, from 5 to 12, from 3 to 10, or from 5 to 10). In some examples, the aqueous electrolyte can have a pH of 3 or more, In some examples, the aqueous electrolyte can have a pH of from 3 to 14. In some examples, the aqueous electrolyte can have a pH of from 5 to 10.

In some examples, the working electrode comprises Pb, Sn, In, Bi, Cd, Zn, Sb, or a combination thereof and the aqueous electrolyte has a pH of from 3 to 14. In some examples, the working electrode comprises Pb and the aqueous electrolyte has a pH of from 3 to 14.

In some examples, the working electrode comprises Pb, Sn, In, Bi, Cd, Zn, Sb, or a combination thereof and the aqueous electrolyte has a pH of from 5 to 10. In some examples, the working electrode comprises Pb the aqueous electrolyte has a pH of from 5 to 10.

In some examples, the method is conducted at a temperature of above freezing of the aqueous electrolyte (e.g., 0° C. or more, 5° C. or more, 10° C. or more, 15° C. or more, 20° C. or more, 25° C. or more, 30° C. or more, 35° C. or more, 40° C. or more, 45° C. or more, 50° C. or more, 55° C. or more, 60° C. or more, 65° C. or more, 70° C. or more, 75° C. or more, 80° C. or more, 85° C. or more, 90° C. or more, 95° C. or more, 100° C. or more, 105° C. or more, 110° C. or more, or 115° C. or more). In some examples, the method is conducted at a temperature of below boiling of the aqueous electrolyte (e.g., 120° C. or less, 115° C. or less, 110° C. or less, 105° C. or less, 100° C. or less, 95° C. or less, 90° C. or less, 85° C. or less, 80° C. or less, 75° C. or less, 70° C. or less, 65° C. or less, 60° C. or less, 55° C. or less, 50° C. or less, 45° C. or less, 40° C. or less, 35° C. or less, 30° C. or less, 25° C. or less, 20° C. or less, 15° C. or less, 10° C. or less, or 5° C. or less). The temperature at which the method is conducted can range from any of the minimum values described above from any of the maximum values described above. For example, the method can be conducted at a temperature of from above freezing to below boiling of the aqueous electrolyte (e.g., from 0° C. to 120° C., from 0° C. to 60° C., from 60° C. to 120° C., from 0° C. to 40° C., from 40° C. to 80° C., from 80° C. to 120° C., from 0° C. to 100° C., from 0° C. to 80° C., from 0° C. to 50° C., from 5° C. to 120° C., from 10° C. to 120° C., from 20° C. to 120° C., from 40° C. to 120° C., from 60° C. to 120° C., from 5° C. to 100° C., from 10° C. to 80° C., or from 20° C. to 50° C.).

In some examples, the working electrode comprises Pb, Sn, In, Bi, Cd, Zn, Sb, or a combination thereof and the method is conducted at a temperature of from 0° C. to 100° C. In some examples, the working electrode comprises Pb and the method is conducted at a temperature of from 0° C. to 100° C.

In some examples, the working electrode comprises Pb, Sn, In, Bi, Cd, Zn, Sb, or a combination thereof and the method is conducted at a temperature from 20° C. to 50° C. In some examples, the working electrode comprises Pb and the method is conducted at a temperature from 20° C. to 50° C.

In some examples, the aqueous electrolyte has a pH of from 3 to 14 and the method is conducted at a temperature of from 0° C. to 100° C. In some examples, the aqueous electrolyte has a pH of from 5 to 10 and the method is conducted at a temperature of from 0° C. to 100° C.

In some examples, the aqueous electrolyte has a pH of from 3 to 14 and the method is conducted at a temperature from 20° C. to 50° C. In some examples, the aqueous electrolyte has a pH of from 5 to 10 and the method is conducted at a temperature from 20° C. to 50° C.

In some examples, the working electrode comprises Pb, Sn, In, Bi, Cd, Zn, Sb, or a combination thereof, the aqueous electrolyte has a pH of from 3 to 14, and the method is conducted at a temperature of from 0° C. to 100° C. In some examples, the working electrode comprises Pb, the aqueous electrolyte has a pH of from 3 to 14, and the method is conducted at a temperature of from 0° C. to 100° C.

In some examples, the working electrode comprises Pb, Sn, In, Bi, Cd, Zn, Sb, or a combination thereof, the aqueous electrolyte has a pH of from 5 to 10, and the method is conducted at a temperature from 20° C. to 50° C. In some examples, the working electrode comprises Pb the aqueous electrolyte has a pH of from 5 to 10, and the method is conducted at a temperature from 20° C. to 50° C.

In some examples, the levulinic acid has an initial concentration of greater than 0 mol/L (e.g., 0.001 mol/L or more, 0.05 mol/L or more, 0.1 mol/L or more, 0.15 mol/L or more, 0.2 mol/L or more, 0.25 mol/L or more, 0.3 mol/L or more, or 0.35 mol/L or more). In some examples, the levulinic acid has an initial concentration of below the solubility limit (e.g., 0.4 mol/L or less, 0.35 mol/L or less, 0.3 mol/L or less, 0.25 mol/L or less, 0.2 mol/L or less, 0.15 mol/L or less, 0.1 mol/L or less, 0.05 mol/L or less, or 0.001 mol/L or less). The initial concentration of the levulinic acid can range from any of the minimum values described above to any of the maximum values described above. For example, the levulinic acid can have an initial concentration from greater than 0 to below the solubility limit (e.g., from greater than 0 to 0.4 mol/L, from greater than 0 to 0.2 mol/L, from 0.2 to 0.4 mol/L, from 0.001 to 0.4 mol/L, from 0.1 to 0.4 mol/L, or from 0.15 to 0.4 mol/L).

In some examples, the aqueous electrolyte can further comprise an additive, a solvent, or a combination thereof.

In some examples, the potential applied can be −1.1 V vs. RHE or less (e.g., −1.2 V or less, −1.3 V or less, −1.4 V or less, −1.5 V or less, −1.6 V or less, −1.7 V or less, or −1.8 V or less). In some examples, the potential applied can be −1.9 V vs. RHE or more (e.g., −1.8 V or more, —1.7 V or more, −1.6 V or more, −1.5 V or more, −1.4 V or more, −1.3 V or more, or −1.2 V or more). The potential applied can range from any of the minimum values described above to any of the maximum values described above. For example, the potential can be from −1.1 to −1.9 V vs. RHE (e.g. from −1.1 V to −1.5 V, from −1.5 V to −1.9 V, from −1.1 V to −1.3 V, from −1.3 V to −1.6 V, from −1.6 V to −1.9 V, from −1.2 V to −1.9 V, or from −1.3 V to −1.9 V).

In some examples, the potential is applied for an amount of time of 1 minute or more (e.g., 2 minutes or more, 3 minutes or more, 4 minutes or more, 5 minutes or more, 6 minutes or more, 7 minutes or more, 8 minutes or more, 9 minutes or more, 10 minutes or more, 15 minutes or more, 20 minutes or more, 25 minutes or more, 30 minutes or more, 35 minutes or more, 40 minutes or more, 45 minutes or more, 50 minutes or more, 55 minutes or more, 60 minutes or more, 70 minutes or more, 80 minutes or more, 90 minutes or more, 100 minutes or more, 110 minutes or more, 120 minutes or more, 150 minutes or more, 180 minutes or more, 210 minutes or more, 240 minutes or more, 270 minutes or more, 300 minutes or more, 330 minutes or more, 360 minutes or more, 390 minutes or more, 420 minutes or more, 450 minutes or more, 480 minutes or more, 540 minutes or more, 600 minutes or more, 660 minutes or more, 720 minutes or more, 780 minutes or more, 840 minutes or more, or 900 minutes or more). In some examples, the potential is applied for an amount of time of 1000 minutes or less (e.g., 900 minutes or less, 840 minutes or less, 780 minutes or less, 720 minutes or less, 660 minutes or less, 600 minutes or less, 540 minutes or less, 480 minutes or less, 450 minutes or less, 420 minutes or less, 390 minutes or less, 360 minutes or less, 330 minutes or less, 300 minutes or less, 270 minutes or less, 240 minutes or less, 210 minutes or less, 180 minutes or less, 150 minutes or less, 120 minutes or less, 110 minutes or less, 100 minutes or less, 90 minutes or less, 80 minutes or less, 70 minutes or less, 60 minutes or less, 55 minutes or less, 50 minutes or less, 45 minutes or less, 40 minutes or less, 35 minutes or less, 30 minutes or less, 25 minutes or less, 20 minutes or less, 15 minutes or less, 10 minutes or less, 9 minutes or less, 8 minutes or less, 7 minutes or less, 6 minutes or less, 5 minutes or less, 4 minutes or less, 3 minutes or less, or 2 minutes or less). The amount of time for which the potential is applied can range from any of the minimum values described above to any of the maximum values described above. For example, the potential can be applied for an amount of time of from 1 to 1000 minutes (e.g., from 1 to 500 minutes, from 500 to 1000 minutes, from 1 to 200 minutes, from 200 to 400 minutes, from 400 to 600 minutes, from 600 to 800 minutes, from 800 to 1000 minutes, from 1 to 800 minutes, from 1 to 600 minutes, from 1 to 400 minutes, from 1 to 100 minutes, from 1 to 60 minutes, from 1 to 30 minutes, from 1 to 10 minutes, from 5 to 1000 minutes, from 10 to 1000 minutes, from 30 to 1000 minutes, from 60 to 1000 minutes, from 100 to 1000 minutes, from 200 to 1000 minutes, from 400 to 1000 minutes, from 600 to 1000 minutes, from 5 to 900 minutes, or from 10 to 400 minutes). In some examples, the potential can be applied for an amount of time of from 10 to 400 minutes.

In some examples, the method further comprises applying a current density. For example, the method can further comprise applying a current density of 1 mA cm$^{-2}$ or more (e.g., 2 mA cm$^{-2}$ or more, 3 mA cm$^{-2}$ or more, 4 mA cm$^{-2}$ or more, 5 mA cm$^{-2}$ or more, 6 mA cm$^{-2}$ or more, 7 mA cm$^{-2}$ or more, 8 mA cm$^{-2}$ or more, 9 mA cm$^{-2}$ or more, 10 mA cm$^{-2}$ or more, 15 mA cm$^{-2}$ or more, 20 mA cm$^{-2}$ or more, 25 mA cm$^{-2}$ or more, 30 mA cm$^{-2}$ or more, 35 mA cm$^{-2}$ or more, 40 mA cm$^{-2}$ or more, 45 mA cm$^{-2}$ or more, 50 mA cm$^{-2}$ or more, 60 mA cm$^{-2}$ or more, 70 mA cm$^{-2}$ or more, 80 mA cm$^{-2}$ or more, 90 mA cm$^{-2}$ or more, 100 mA cm$^{-2}$ or more, 125 mA cm$^{-2}$ or more, 150 mA cm$^{-2}$ or more, 175 mA cm$^{-2}$ or more, 200 mA cm$^{-2}$ or more, 225 mA cm$^{-2}$ or more, 250 mA cm$^{-2}$ or more, 300 mA cm$^{-2}$ or more, 350 mA cm$^{-2}$ or more, 400 mA cm$^{-2}$ or more, 450 mA cm$^{-2}$ or more, 500 mA cm$^{-2}$ or more, 600 mA cm$^{-2}$ or more, 700 mA cm$^{-2}$ or more, 800 mA cm$^{-2}$ or more, 900 mA cm$^{-2}$ or more, 1000 mA cm$^{-2}$ or more, 1250 mA cm$^{-2}$ or more, 1500 mA cm$^{-2}$ or more, or 1750 mA cm$^{-2}$ or more). In some examples, the method can further comprise applying a current density of 2000 mA cm$^{-2}$ or less (e.g., 1750 mA cm$^{-2}$ or less, 1500 mA cm$^{-2}$ or less, 1250 mA cm$^{-2}$ or less, 1000 mA cm$^{-2}$ or less, 900 mA cm$^{-2}$ or less, 800 mA cm$^{-2}$ or less, 700 mA cm$^{-2}$ or less, 600 mA cm$^{-2}$ or less, 500 mA cm$^{-2}$ or less, 450 mA cm$^{-2}$ or less, 400 mA cm$^{-2}$ or less, 350 mA cm$^{-2}$ or less, 300 mA cm$^{-2}$ or less, 250 mA cm$^{-2}$ or less, 225 mA cm$^{-2}$ or less, 200 mA cm$^{-2}$ or less, 175 mA cm$^{-2}$ or less, 150 mA cm$^{-2}$ or less, 125 mA cm$^{-2}$ or less, 100 mA cm$^{-2}$ or less, 90 mA cm$^{-2}$ or less, 80 mA cm$^{-2}$ or less, 70 mA cm$^{-2}$ or less, 60 mA cm$^{-2}$ or less, 50 mA cm$^{-2}$ or less, 45 mA cm$^{-2}$ or less, 40 mA cm$^{-2}$ or less, 35 mA cm$^{-2}$ or less, 30 mA cm$^{-2}$ or less, 25 mA cm$^{-2}$ or less, 20 mA cm$^{-2}$ or less, 15 mA cm$^{-2}$ or less, 10 mA cm$^{2}$ or less, 9 mA cm$^{-2}$ or less, 8 mA cm$^{-2}$ or less, 7 mA cm$^{-2}$ or less, 6 mA cm$^{-2}$ or less, 5 mA cm$^{-2}$ or less, 4 mA cm$^{-2}$ or less, 3 mA cm$^{-2}$ or less, or 2 mA cm$^{-2}$ or less). The current density applied can range from any of the minimum values described above to any of the maximum values described above. For example, the method can further comprise applying a current density of from 1 to 2000 mA cm$^{-2}$ (e.g., from 1 to 1000 mA cm$^{-2}$, from 1000 to 2000 mA cm$^{-2}$, from 1 to 500 mA cm$^{-2}$, from 500 to 1000 mA cm$^{-2}$, from 1000 to 1500 mA cm$^{-2}$, from 1500 to 2000 mA cm$^{-2}$, from 1 to 1750 mA cm$^{-2}$, from 1 to 1500 mA cm$^{-2}$, from 1 to 1250 mA cm$^{-2}$, from 1 to 750 mA cm$^{-2}$, from 1 to 250 mA cm$^{-2}$, from 1 to 100 mA cm$^{-2}$, from 1 to 50 mA cm$^{-2}$, from 5 to 2000 mA cm$^{-2}$, from 10 to 2000 mA cm$^{-2}$, from 50 to 2000 mA cm$^{-2}$, from 100 to 2000 mA cm$^{-2}$, from 250 to 2000 mA cm$^{-2}$, from 500 to 2000 mA cm$^{-2}$, from 750 to 2000 mA cm$^{-2}$, from 1250 to 2000 mA cm$^{-2}$, from 5 to 1750 mA cm$^{-2}$, from 10 to 1500 mA cm$^{-2}$, or from 10 to 205 mA cm$^{-2}$). In some examples, the method can further comprise applying a current density of from 10 to 205 mA cm$^{-2}$.

In some examples, the methods can further comprise agitating the aqueous electrolyte. Agitating the aqueous electrolyte can be accomplished, for example, by mechanical stirring, shaking, vortexing, sonication (e.g., bath sonication, probe sonication, ultrasonication), and the like, or combinations thereof.

In some examples, the method produces the hydroxyvaleric acid from the levulinic acid with a selectivity of 50% or more (e.g., 55% or more, 60% or more, 65% or more, 70% or more, 75% or more, 80% or more, 85% or more, 90% or more, 95% or more, or 99% or more). In some examples, the method produces the hydroxyvaleric acid from the levulinic acid with a selectivity of 100% or less (e.g., 95% or less, 90% or less, 85% or less, 80% or less, 75% or less, 70% or less, 65% or less, 60% or less, or 55% or less). The selectivity with which the method produces the hydroxyvaleric acid can range from any of the minimum values described above to any of the maximum values described above. For example, the method can produce the hydroxyvaleric acid from the levulinic acid with a selectivity of from 50% to 100% (e.g., from 50% to 75%, from 75% to 100%, from 50% to 60%, from 60% to 70%, from 70% to 80%, from 80% to 90%, from 90% to 100%, from 60% to 100%, from 70% to 100%, from 80% to 100%, from 95% to 100%, or from 99% to 100%).

In some examples, the method produces the hydroxyvaleric acid from the levulinic acid with a Faradaic efficiency of 50% or more (e.g., 55% or more, 60% or more, 65% or more, 70% or more, 75% or more, 80% or more, 85% or more, 90% or more, 95% or more, or 99% or more). In some examples, the method produces the hydroxyvaleric acid from the levulinic acid with a Faradaic efficiency of 100% or less (e.g., 95% or less, 90% or less, 85% or less, 80% or less, 75% or less, 70% or less, 65% or less, 60% or less, or 55% or less). The Faradaic efficiency with which the method produces the hydroxyvaleric acid can range from any of the minimum values described above to any of the maximum values described above. For example, the method can produce the hydroxyvaleric acid from the levulinic acid with a Faradaic efficiency of from 50% to 100% (e.g., from 50% to 75%, from 75% to 100%, from 50% to 60%, from 60% to 70%, from 70% to 80%, from 80% to 90%, from 90% to 100%, from 60% to 100%, from 70% to 100%, or from 80% to 100%).

In some examples, the method converts greater than 0% of the levulinic acid to the hydroxyvaleric acid (e.g., 1% or more, 5% or more, 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, 95% or more, or 99% or more). In some examples, the method converts 100% or less of the levulinic acid to the hydroxyvaleric acid (e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, or 5% or less). The amount of levulinic acid converted to the hydroxyvaleric acid can range from any of the minimum values described above to any of the maximum values described above. For example, the method can convert from greater than 0 to 100% of the levulinic acid to the hydroxyvaleric acid (e.g., from 5% to 100%, from 10% to 100%, from 20% to 100%, from 25% to 100%, from 50% to 100%, from 60% to 100%, from 70% to 100%, or from 80% to 100%).

In some examples, the method produces the hydroxyvaleric acid from the levulinic acid at a production rate of 5 g $L^{-1}$ $h^{-1}$ or more (e.g., 10 g $L^{-1}$ $h^{-1}$ or more, 15 g $L^{-1}$ $h^{-1}$ or more, 20 g $L^{-1}$ $h^{-1}$ or more, 25 g $L^{-1}$ $h^{-1}$ or more, 30 g $L^{-1}$ $h^{-1}$ or more, 35 g $L^{-1}$ $h^{-1}$ or more, 40 g $L^{-1}$ $h^{-1}$ or more, 45 g $L^{-1}$ $h^{-1}$ or more, 50 g $L^{-1}$ $h^{-1}$ or more, 60 g $L^{-1}$ $h^{-1}$ or more, 70 g $L^{-1}$ $h^{-1}$ or more, 80 g $L^{-1}$ $h^{-1}$ or more, 90 g $L^{-1}$ $h^{-1}$ or more, 100 g $L^{-1}$ $h^{-1}$ or more, 125 g $L^{-1}$ $h^{-1}$ or more, 150 g $L^{-1}$ $h^{-1}$ or more, 175 g $L^{-1}$ $h^{-1}$ or more, 200 g $L^{-1}$ $h^{-1}$ or more, 225 g $L^{-1}$ $h^{-1}$ or more, 250 g $L^{-1}$ $h^{-1}$ or more, 300 g $L^{-1}$ $h^{-1}$ or more, 350 g $L^{-1}$ $h^{-1}$ or more, 400 g $L^{-1}$ $h^{-1}$ or more, 450 g $L^{-1}$ $h^{-1}$ or more, 500 g $L^{-1}$ $h^{-1}$ or more, 600 g $L^{-1}$ $h^{-1}$ or more, 700 g $L^{-1}$ $h^{-1}$ or more, 800 g $L^{-1}$ $h^{-1}$ or more, or 900 g $L^{-1}$ $h^{-1}$ or more). In some examples, the method produces the hydroxyvaleric acid from the levulinic acid at a production rate of 1000 g $L^{-1}$ $h^{-1}$ or less (e.g., 900 g $L^{-1}$ $h^{-1}$ or less, 800 g $L^{-1}$ $h^{-1}$ or less, 700 g $L^{-1}$ $h^{-1}$ or less, 600 g $L^{-1}$ $h^{-1}$ or less, 500 g $L^{-1}$ $h^{-1}$ or less, 450 g $L^{-1}$ $h^{-1}$ or less, 400 g $L^{-1}$ $h^{-1}$ or less, 350 g $L^{-1}$ $h^{-1}$ or less, 300 g $L^{-1}$ $h^{-1}$ or less, 250 g $L^{-1}$ $h^{-1}$ or less, 225 g $L^{-1}$ $h^{-1}$ or less, 200 g $L^{-1}$ $h^{-1}$ or less, 175 g $L^{-1}$ $h^{-1}$ or less, 150 g $L^{-1}$ $h^{-1}$ or less, 125 g $L^{-1}$ $h^{-1}$ or less, 100 g $L^{-1}$ $h^{-1}$ or less, 90 g $L^{-1}$ $h^{-1}$ or less, 80 g $L^{-1}$ $h^{-1}$ or less, 70 g $L^{-1}$ $h^{-1}$ or less, 60 g $L^{-1}$ $h^{-1}$ or less, 50 g $L^{-1}$ $h^{-1}$ or less, 45 g $L^{-1}$ $h^{-1}$ or less, 40 g $L^{-1}$ $h^{-1}$ or less, 35 g $L^{-1}$ $h^{-1}$ or less, 30 g $L^{-1}$ $h^{-1}$ or less, 25 g $L^{-1}$ $h^{-1}$ or less, 20 g $L^{-1}$ $h^{-1}$ or less, 15 g $L^{-1}$ $h^{-1}$ or less, or 10 g $L^{-1}$ $h^{-1}$ or less). The production rate can range from any of the minimum values described above to any of the maximum values described above. For example, the method can produce the hydroxyvaleric acid from the levulinic acid at a production rate of from 5 to 1000 g $L^{-1}$ $h^{-1}$ (e.g., from 5 to 500 g $L^{-1}$ $h^{-1}$, from 500 to 1000 g $L^{-1}$ $h^{-1}$, from 5 to 200 g $L^{-1}$ $h^{-1}$, from 200 to 400 g $L^{-1}$ $h^{-1}$, from 400 to 600 g $L^{-1}$ $h^{-1}$, from 600 to 800 g $L^{-1}$ $h^{-1}$, from 800 to 1000 g $L^{-1}$ $h^{-1}$, from 5 to 800 g $L^{-1}$ $h^{-1}$, from 5 to 600 g $L^{-1}$ $h^{-1}$, from 5 to 400 g $L^{-1}$ $h^{-1}$, from 5 to 100 g $L^{-1}$ $h^{-1}$, from 5 to 50 g $L^{-1}$ $h^{-1}$, from 5 to 25 g $L^{-1}$ $h^{-1}$, from 10 to 1000 g $L^{-1}$ $h^{-1}$, from 25 to 1000 g $L^{-1}$ $h^{-1}$, from 50 to 1000 g $L^{-1}$ $h^{-1}$, from 100 to 1000 g $L^{-1}$ $h^{-1}$, from 200 to 1000 g $L^{-1}$ $h^{-1}$, from 400 to 1000 g $L^{-1}$ $h^{-1}$, from 600 to 1000 g $L^{-1}$ $h^{-1}$, from 10 to 900 g $L^{-1}$ $h^{-1}$, or from 20 to 800 g $L^{-1}$ $h^{-1}$). In some examples, the method produces the hydroxyvaleric acid from the levulinic acid at a production rate of from 5 to 50 g $L^{-1}$ $h^{-1}$.

In some examples, the method further synthesizes valeric acid, gamma-valerolactone, or a combination thereof from the levulinic acid.

In some examples, the method is a one-pot method.

Also described herein are methods of synthesizing gamma-valerolactone from hydroxyvaleric acid. For example, the methods described herein can further comprise subsequently converting the electrochemically synthesized hydroxyvaleric acid to gamma-valerolactone. In some examples, the methods can comprise direct aqueous electrochemical conversion of the hydroxyvaleric acid to gamma-valerolactone. In some examples, the methods can comprise electrolysis of the levulinic acid followed by acid-catalyzed esterification to form the gamma-valerolactone. In some examples, the methods can comprise, after synthesizing the hydroxyvaleric acid, adding 30 μL of $H_2SO_4$ per mL of electrolyte to initiate acid-catalyzed esterification. In some examples, the method is a one-pot method.

In some examples, the method converts greater than 0% of the hydroxyvaleric acid to the gamma-valerolactone (e.g., 1% or more, 5% or more, 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, 95% or more, or 99% or more). In some examples, the method converts 100% or less of the hydroxyvaleric acid to the gamma-valerolactone (e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, or 5% or less). The amount of hydroxyvaleric acid converted to the gamma-valerolactone can range from any of the minimum values described above to any of the maximum values described above. For example, the method can convert from greater than 0 to 100% of the hydroxyvaleric acid to the gamma-valerolactone (e.g., from 5% to 100%, from 10% to 100%, from 20% to 100%, from 25% to 100%, from 50% to 100%, from 60% to 100%, from 70% to 100%, from 80% to 100%, from 90% to 100%, or from 95% to 100%).

In some examples, the method produces the gamma-valerolactone from the hydroxyvaleric acid with a selectivity of 50% or more (e.g., 55% or more, 60% or more, 65% or more, 70% or more, 75% or more, 80% or more, 85% or more, 90% or more, 95% or more, or 99% or more). In some examples, the method produces the gamma-valerolactone from the hydroxyvaleric acid with a selectivity of 100% or less (e.g., 95% or less, 90% or less, 85% or less, 80% or less, 75% or less, 70% or less, 65% or less, 60% or less, or 55% or less). The selectivity with which the method produces the gamma-valerolactone from the hydroxyvaleric acid can range from any of the minimum values described above to any of the maximum values described above. For example, the method can produce the gamma-valerolactone from the hydroxyvaleric acid with a selectivity of from 50% to 100% (e.g., from 50% to 75%, from 75% to 100%, from 50% to 60%, from 60% to 70%, from 70% to 80%, from 80% to 90%, from 90% to 100%, from 60% to 100%, from 70% to 100%, from 80% to 100%, from 95% to 100%, or from 99% to 100%).

In some examples, the method produces the gamma-valerolactone from the hydroxyvaleric acid with a yield of 50% or more (e.g., 55% or more, 60% or more, 65% or more, 70% or more, 75% or more, 80% or more, 85% or more, 90% or more, 95% or more, or 99% or more). In some examples, the method produces the gamma-valerolactone from the hydroxyvaleric acid with a yield of 100% or less (e.g., 95% or less, 90% or less, 85% or less, 80% or less, 75% or less, 70% or less, 65% or less, 60% or less, or 55% or less). The yield with which the method produces the gamma-valerolactone from the hydroxyvaleric acid can range from any of the minimum values described above to any of the maximum values described above. For example, the method can produce the gamma-valerolactone from the hydroxyvaleric acid with a yield of from 50% to 100% (e.g., from 50% to 75%, from 75% to 100%, from 50% to 60%, from 60% to 70%, from 70% to 80%, from 80% to 90%, from 90% to 100%, from 60% to 100%, from 70% to 100%, from 80% to 100%, or from 90% to 100%).

In some examples, the method produces the gamma-valerolactone from the hydroxyvaleric acid in an amount of time of 1 minute or more (e.g., 5 minutes or more, 10 minutes or more, 15 minutes or more, 20 minutes or more, 25 minutes or more, 30 minutes or more, 35 minutes or more, 40 minutes or more, 45 minutes or more, 50 minutes or more, 55 minutes or more, 60 minutes or more, 65 minutes or more, 70 minutes or more, 75 minutes or more, 80 minutes or more, 85 minutes or more, 90 minutes or more, 95 minutes or more, 100 minutes or more, 105 minutes or more, 110 minutes or more, or 115 minutes or more). In some examples, In some examples, the method produces the gamma-valerolactone from the hydroxyvaleric acid in an amount of time of 120 minutes or less (e.g., 115 minutes or less, 110 minutes or less, 105 minutes or less, 100 minutes or less, 95 minutes or less, 90 minutes or less, 85 minutes or less, 80 minutes or less, 75 minutes or less, 70 minutes or less, 65 minutes or less, 60 minutes or less, 55 minutes or less, 50 minutes or less, 45 minutes or less, 40 minutes or less, 35 minutes or less, 30 minutes or less, 25 minutes or less, 20 minutes or less, 15 minutes or less, 10 minutes or less, or 5 minutes or less). The amount of time can range from any of the minimum values described above to any of the maximum values described above. For example, the method can produce the gamma-valerolactone from the hydroxyvaleric acid in an amount of time of from 1 to 120 minutes (e.g., from 1 to 60 minutes, from 60 to 120 minutes, from 1 to 30 minutes, from 30 to 60 minutes, from 60 to 90 minutes, from 90 to 120 minutes, from 1 to 100 minutes, from 1 to 80 minutes, from 1 to 40 minutes, from 1 to 20 minutes, from 1 to 10 minutes, from 5 to 120 minutes, from 10 to 120 minutes, from 20 to 120 minutes, from 30 to 120 minutes, from 40 to 120 minutes, from 80 to 120 minutes, from 5 to 100 minutes, from 5 to 60 minutes, or from 5 to 30 minutes). In some examples, the method produces the gamma-valerolactone from the hydroxyvaleric acid in an amount of time of from 5 to 30 minutes.

Also described herein are methods of use of the hydroxyvaleric acid, gamma-valerolactone, or a combination of thereof produced by any of the methods described herein.

For example, also disclosed herein are methods of use of the hydroxyvaleric acid produced by any of the methods disclosed herein. The method can, for example, comprise using the hydroxyvaleric acid to make a biodegradable polymer, biocompatible polymer, or a combination thereof. In some examples, the methods can comprise using the hydroxyvaleric acid to make a polyester, a poly(hydroxy acid), gamma-valerolactone, or a combination thereof.

For example, also disclosed herein are methods of use of the gamma-valerolactone produced by any of the methods described herein. The method can comprise, for example, using the gamma-valerolactone as a fuel, a green solvent, or a combination thereof.

A number of embodiments of the invention have been described. Nevertheless, it will be understood that various modifications may be made without departing from the spirit and scope of the invention. Accordingly, other embodiments are within the scope of the following claims. The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1—Tuning the Selectivity of Electrochemical Levulinic Acid Reduction to 4-Hydroxyvaleric Acid: A Monomer for Biocompatible and Biodegradable Plastics Abstract. Levulinic acid (LA) is a biomass-derived feedstock that can be converted to a wide array of value-added products; several of these can be accessed efficiently by electrochemical conversion. Herein, a study of factors governing levulinic acid conversion in electrochemical environments is presented. Most notably, an unprecedented pathway forming 4-hydroxyvaleric acid (HVA), a valuable monomer that can be used for production of bio-polyesters—specifically, poly(hydroxy acids)—as well as γ-valerolactone (GVL) (a green fuel/solvent) and other fine chemicals, was identified. This method shows >99.9% selectivity and >80% faradaic efficiency for conversion above 80%. Production rates higher than 40 g L$^{-1}$ h$^{-1}$ (or 200 kg L$^{-1}$ m$^{-2}_{geom}$.H$^{-1}$) were achieved; these are substantially higher than reports for compatible biochemical methods. Mechanistic insights regarding the steering of selectivity toward this new pathway in comparison to known electrochemical routes toward valeric acid (VA) or to γ-valerolactone were further identified. Finally, a fast, sequential one-pot synthesis route to transform electrochemically-produced 4-hydroxyvaleric acid to γ-valerolactone with higher overall selectivity and faradaic efficiency than can be achieved by direct aqueous electrochemical conversion of levulinic acid to γ-valerolactone (96% conversion and >99.9% selectivity, giving a total yield of 93% from levulinic acid) is also provided.

Introduction. Levulinic acid (4-oxopentanoic acid, LA) has been identified as a highly versatile biomass-derived platform molecule, as highlighted by the U.S. Department of Energy [1] and a number of reports on biorefining for a sustainable chemical supply chain [2-4]. Levulinic acid is produced at industrial-scale via acid-catalyzed hydrolysis of lignocellulose [2-4] and can be upgraded to several commodities and fine chemicals that are platforms for production of fuels and fuel-additives (e.g. 2-methyltetrahydrofuran, 5-nonanone, alkyl levulinates, γ-valerolactone), polymers (e.g. hydroxyvaleric acid, diphenolic acid), herbicides and pesticides (e.g. α-aminolevulinic acid), pharmaceuticals and food additives (e.g. alkyl levulinates, hydroxyvaleric acid, γ-valerolactone), and other materials and products [5]. Levulinic acid upgrading toward an assortment of these products has been demonstrated by thermo-, bio-, and electro-chemical routes [5-8]. Advantages of electrochemical valorization (both oxidative and reductive) over thermochemical methods can often include operability at near-ambient conditions and compatibility with aqueous feedstocks. In comparison to biochemical/enzymatic routes, electrochemistry generally offers much faster conversion rates and simple separations [9-11]. It is also worth mentioning that electrochemical methods are in many cases scalable and have been used for the production of a variety of compounds in several chemical industries [12,13].

FIG. 1 shows the major electrochemical transformations presently known to be accessible from levulinic acid; electro-oxidation and electro-reduction routes are organized, respectively, at the left and right sides of FIG. 1, with exemplary references for each also noted. It has been previously demonstrated that, through engineering of reaction conditions, levulinic acid can be reduced predominantly into valeric acid (VA) or γ-valerolactone (GVL); conversely, it can be oxidized into 4-hydroxybutanone, 3-butenone, or 2,7-octanedione. Octane can also be accessed in a second step via Kolbe oxidation of valeric acid or electrohydrodeoxygenation of 2,7-octanedione [13]. The present work now adds 4-hydroxyvaleric acid (HVA, also known as 4-hydroxypropanoic acid, valued as a green monomer) to the list of tunable reduction products. Selectivity of >99.9% and >80% faradaic efficiency (FE) for >80% conversion are shown, and further a one-pot synthesis route is provided to transform the 4-hydroxyvaleric acid to γ-valerolactone (96% conversion and >99.9% selectivity, giving a yield of 96% from levulinic acid). This route avoids nonaqueous mediated conditions previously required to generate γ-valerolactone efficiently by electrosynthesis [8].

Focusing on the reductive paths, selectivity between valeric acid and γ-valerolactone has been observed to depend on the pH of the supporting electrolyte. Strongly acidic media (0.5-1.0 M H$_2$SO$_4$) tend to favor the formation of valeric acid [14,15], while γ-valerolactone has been mainly observed in neutral or alkaline conditions (pH 7.5 phosphate buffer [14] or 0.1 M NaOH [15]). For the acidic electrolyses, several works have shown high selectivities for valeric acid (>85% amongst organic products) with high faradaic efficiencies (44-65%, for conversion >70%) [13-17]. At elevated pH, the highest faradaic efficiency for levulinic acid reduction to γ-valerolactone in aqueous solutions was demonstrated by Schröder et al. [15] (20% faradaic efficiency, with 70% γ-valerolactone selectivity) on an Fe cathode, while higher selectivity (amongst the organic products) was found by Li et al. [14] using a PbS cathode, albeit with lower faradaic efficiency (6.2%, with γ-valerolactone selectivity 100%). Recently, Han et al. [8] also showed complete selectivity to γ-valerolactone at much higher faradaic efficiency (79%), though conversion values were not mentioned, and the reaction was performed in an organic solvent with ionic liquid as supporting electrolyte (1-butyl-3-methylimidazolium tetrafluoroborate in acetonitrile). Concerning the cathode material, carbon, Al, Ti, Fe, Ni, Cu, Zn, Ga, Ag, Cd, In, Sn, Sb, and Pb have been tested, but Pb (or Pb-based) cathodes consistently show the highest combined faradaic efficiency and conversion [15,17]. Until now, 4-hydroxyvaleric acid has only been proposed—not shown—as an intermediate in the electrochemical reduction of levulinic acid to γ-valerolactone, and it has not before been generated as a product [8,14,16,17].

Selective routes to 4-hydroxyvaleric acid are desirable as this hydroxycarboxylic acid is a versatile compound that can be used as a monomer for production of biodegradable and biocompatible polyesters—poly(hydroxy acids), PHAs—as well as other diverse commodities, fine chemicals, pesticides, and pharmaceuticals [19,20]. Focusing only on the biopolymers and bioplastics industry, the projected global market will reach USD ~28 billion by 2025 and 4-hydroxyvaleric acid-derived polymers have the potential to fill a significant fraction of this demand with a variety of homopolymers and co-polymers that exhibit outstanding physicochemical properties for biomedical use, packaging, and other technological applications [21-25]. Several companies including Metabolix, P&G, and TEPHA already manufacture PHA products [26], but the application of these polymers is still limited due to absence of technology to produce the 4-hydroxyvaleric acid monomer efficiently on a large scale. Polymerization routes are discussed elsewhere, but focusing on 4-hydroxyvaleric acid monomer [27], it has been previously produced via chemical depolymerization of intracellular PHAs (polyhydroxyalkanoates, which are synthesized by some types of bacteria) [27] and by direct biochemical reduction of levulinic acid [19]. The former method suffers from the use of harsh conditions, expensive catalysts, and toxic solvents. Low yields from incomplete depolymerization are also common—typically, only 30-50% of the carbon source fed to the bacteria is converted into PHAs, while the recovery of converted hydroxyacid monomers after hydrolysis has also not been reported above 88%. In contrast, the direct biochemical methods are generally performed under milder conditions (closer to neutral pH, aqueous solution, room-temperature). However, they still have shown relatively slow rates of production, hindering industrial-scale prospects for this method. Two of the most efficient biochemical demonstrations were by Sathesh-Prabu et al. [20] and Kim et al. [28] Sathesh-Prabu et al. showed 4-hydroxyvaleric acid production of 50 g L$^{-1}$ from levulinic acid (with 97% conversion) in 100 h (i.e., 0.5 g L$^{-1}$ h$^{-1}$), using a 250 mL bioreactor containing a genetically modified

*Pseudomonas putida* KT2440 strain culture [20]. Kim et al. [28] developed a large-scale method for production of 4-hydroxyvaleric acid via enzymatic reduction of levulinic acid using an engineered 3-hydroxybutyrate dehydrogenase (3HBDH) from an *Escherichia coli* strain. With this method, 4.2 g $L^{-1}$ $h^{-1}$ of 4-hydroxyvaleric acid could be produced (titer 100 g $L^{-1}$ in a 5-L bioreactor), with 92% levulinic acid conversion [28].

Herein, a number of mechanistic insights regarding levulinic acid reduction (LAR) into valeric acid, γ-valerolactone, and 4-hydroxyvaleric acid are discussed, and a batch electrochemical method is shown for conversion of levulinic acid into 4-hydroxyvaleric acid at a production rate higher than 40 g $L^{-1}$ $h^{-1}$ (i.e., 200 kg $L^{-1}$ $m^{-2}_{geom.}$ $H^{-1}$) with >99.9% selectivity, and conversion and faradaic efficiency both above 80% for one stoichiometric equivalent of charge (2e$^-$/levulinic acid) passed. This rate is more than nine times higher than the highest recorded biochemical methods [19, 20,27,28], and this can be increased by further reaction engineering (optimizing mass transport, reactor area/volume (A/V) ratio, etc.). Complete levulinic acid conversion could also be achieved, albeit with decreasing rate and faradaic efficiency toward the end of electrolysis. An easy one-pot synthetic method to convert 4-hydroxyvaleric acid into γ-valerolactone is also presented that proceeds in 15 min with 100% selectivity and 96% conversion.

Experimental Methods

Materials and Chemicals. All chemicals were of analytical grade and were used directly without further purification: Levulinic acid (Sigma-Aldrich, >99.5%), Valeric acid (Sigma-Aldrich, >99.5%), γ-valerolactone (Sigma-Aldrich, >99.5%), Pb plate (Goodfellow, 99.99+%), $LiClO_4$ (Sigma-Aldrich, >99.9%), $NaClO_4$ (Sigma-Aldrich, >99.9%), $KClO_4$ (Sigma-Aldrich, >99.9%), $CsClO_4$ (Sigma-Aldrich, >99.9%), $LiHCO_3$ (Sigma-Aldrich, >99.5%), $NaHCO_3$ (Sigma-Aldrich, >99.5%), $KHCO_3$ (Sigma-Aldrich, >99.5%), $CsHCO_3$ (Sigma-Aldrich, >99.5%), $NaH_2PO_4$ (Synth, >95%), $Na_2HPO_4$ (Synth, >95%), Suprapure $H_2SO_4$ (Sigma-Aldrich, >99.999%), Suprapure $HClO_4$ (Sigma-Aldrich, >99.999%), Acetic acid (Sigma-Aldrich, >99.5%), Potassium acetate (Sigma-Aldrich, >99.5%), 0.05 wt. % sodium 3-(trimethylsilyl)-2,2,3,3-tetradeuteropropionate (TMSP) in $D_2O$ (99.9 at. % D, Sigma-Aldrich), Argon (UHP, Airgas Inc.). Solutions were prepared using ultra-pure deionized water with a specific resistance of >18.2 MΩ cm (purified by a Milli-Q, Milipore Inc.).

Electrochemical experiments. Electrochemical experiments were carried out using a conventional three-electrode H-type cell, with cathodic and anodic compartments (10 mL each) separated by a proton- or anion-exchange membrane (Nafion® 117 or Fumapem® FAA-3-50, Fuel Cell Store), depending on pH. A 3 $cm^2$ Pt-plate and a leak-free Ag/AgCl/Cl$^-_{(sat.KCl)}$ were used as auxiliary and reference electrodes (AE, RE), respectively. The reference electrode was calibrated against a reversible hydrogen electrode (RHE), and all potentials in this work are referenced to RHE. A 2 $cm^2$ Pb (C-shaped) plate was used as the working electrode (WE). The working electrode was cleaned in 30% v/v $HNO_3$ and rinsed in deionized water immediately before each experiment. The electrochemical cell was degassed with $Ar_{(g)}$ and the temperature was controlled by a thermostatic bath (Fisher Scientific). Electrochemical measurements were performed with a potentiostat/galvanostat (Gamry Instruments, Reference 3000). Uncompensated resistance ($R_u$) was measured by electrochemical impedance spectroscopy (EIS) and/or current interrupt mode, and all electrochemical measurements were $R_u$ corrected. Electrolysis experiments were performed by chronocoulometry, controlling the exact equivalent charge for each experiment (2F or 4F per levulinic acid mol) and under constant magnetic stirring (1500 rpm, if not specified).

Product identification and quantification. Products of electrolysis were identified and quantified by $^1H$ NMR and liquid chromatography (LC); procedure details are organized in the Supporting Information. For NMR analysis, a Bruker AVANCE-III 400 MHz NMR spectrometer was used, and liquid chromatography analyses were performed in an Advion 2000 HPLC equipped with a 300 mm×6.5 mm sulfonated polystyrene gel column (Hi-Plex H, Agilent), a UV diode array detector (DAD), and an Advion Expression Compact Mass Spectrometer (S Series). The experiments for optimization of mobile phase, elution rate, and column temperature, as well as the external calibration curves for levulinic acid (LA), valeric acid (VA), γ-valerolactone (GVL), and 4-hydroxyvaleric acid (HVA) are described in the Supporting Information. The chemical and analytical distinction between γ-valerolactone and 4-hydroxyvaleric acid was based on the chemical shift signature and molecular ion fragment of their $^1H$ NMR and mass spectra, respectively.

In-situ ATR-FTIR. A Nicolet 6700 FTIR spectrometer (Thermo Fisher Scientific) with VeeMAX™ III (PIKE Technologies) ATR configuration chamber was used for in-situ ATR-FTIR experiments. The spectroelectrochemical experiments were performed in a J1W Jackfish cell (PIKE Technologies) with a PTFE/PEEK base, and IRUBIS Si(100) specialized 1-ATR element (single-bounce ATR crystal). A polycrystalline Au electrode was chemically deposited (electroless deposition) based on a procedure first established and demonstrated by Osawa et al. [29]. The experiment comprised two stages: electrodeposition of Pb onto the polycrystalline Au electrode, followed by demonstration of Pb—$H_2$ formation with electrochemical ATR-FTIR. The Pb film was electrodeposited from a 1 mM Pb(ClO$_4$)$_2$ solution, at −0.4V vs Ag/AgCl$_{sat.KCl}$ for 70 mC $cm^{-2}$. The spectroelectrochemical experiment was then done as a differential potential step scan in 0.1 M $KClO_4$ electrolyte. The FTIR background (64 interferograms) was taken at 0.1 V vs RHE, and spectra were taken at different sequential potential steps from −0.05 to −1.90 V vs RHE, with incremental steps of −150 mV. To allow stable behavior resulting in a quasi-steady-state (at each potential during the potential step scan), spectrum collection was begun 10 seconds after each new bias application. For each potential measurement, the electrode was kept polarized under the potential applied in the prior measurement (without relaxation) to exclude double layer charging/discharging effects. Each measurement in the series included 128 interferograms averaged by the instrument software (OMNIC™ Specta Software).

Results and Discussion

Effect of pH on selectivity and mechanistic implications. Product distributions and rates of levulinic acid reduction (LAR) were first evaluated under a range of controlled pH conditions in order to assess their impact and to gain some mechanistic insight. These initial electrolyses were performed at a constant temperature of 20° C., with an initial levulinic acid concentration of 0.1 mol $L^1$ and a total charge of 4F per mol of levulinic acid passed (~1.5-2.0 h of electrolysis). Pb was used as the working electrode, and a potential of −1.9 V vs. RHE was chosen, as exploratory studies revealed this condition to balance high rate and faradaic efficiency against the propensity of Pb toward cathodic corrosion (disintegration) at more extreme negative potentials—similar observations have been made in other studies of levulinic acid reduction using Pb [13-17]. For intermediate pH solutions, 0.1 M KClO$_4$ (a neutral salt) was added to buffer solutions as a co-supporting electrolyte to maintain sufficient conductivity without impacting the pH. At the end of each electrolysis, the final pH of the solutions was also measured, and it was observed that all strongly acidic/basic and buffered conditions were stable.

Figure 2:
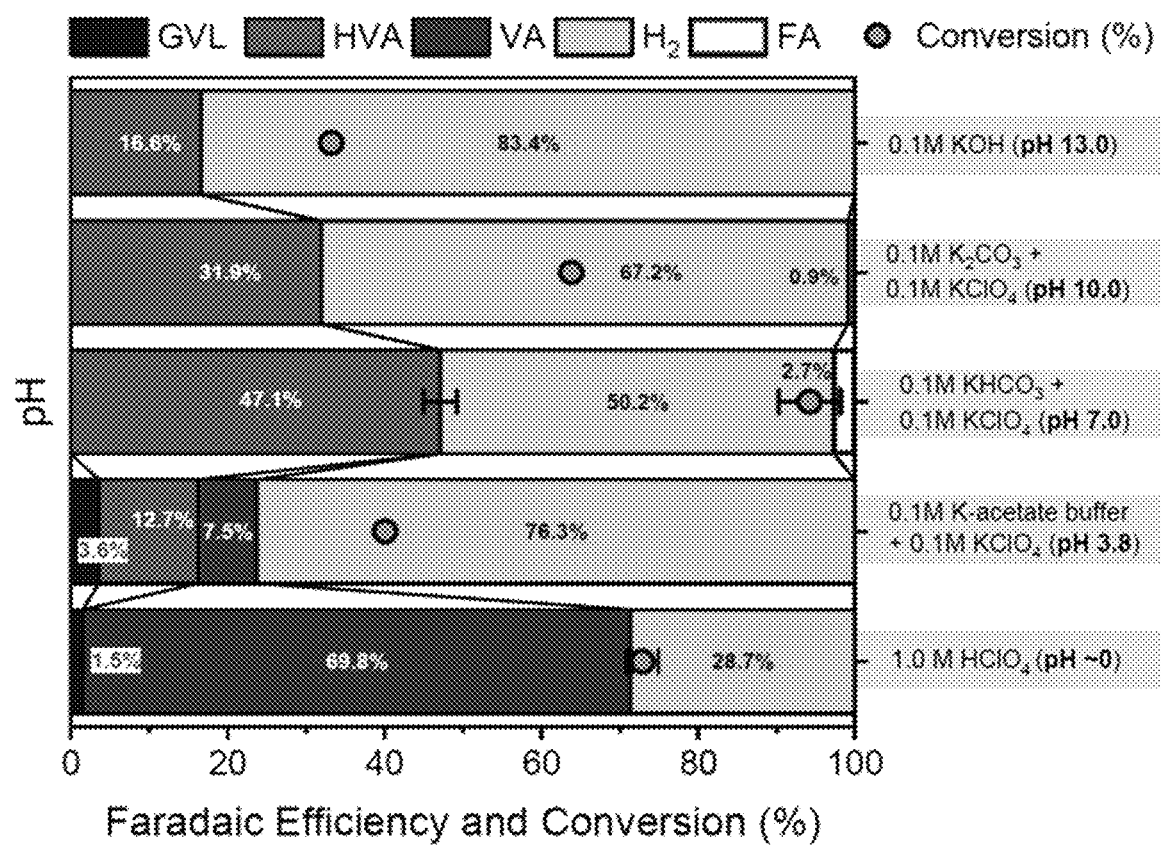
FIG. 2. pH effects for electrolyses performed with 0.1 mol $L^{-1}$ levulinic acid, at −1.9 V vs. RHE, with passage of 4 F/mol levulinic acid. Conversion and faradaic efficiencies are shown for each product (VA: valeric acid, HVA: 4-hydroxyvaleric acid, GVL: γ-valerolactone, and FA: formic acid).
Figure 16:
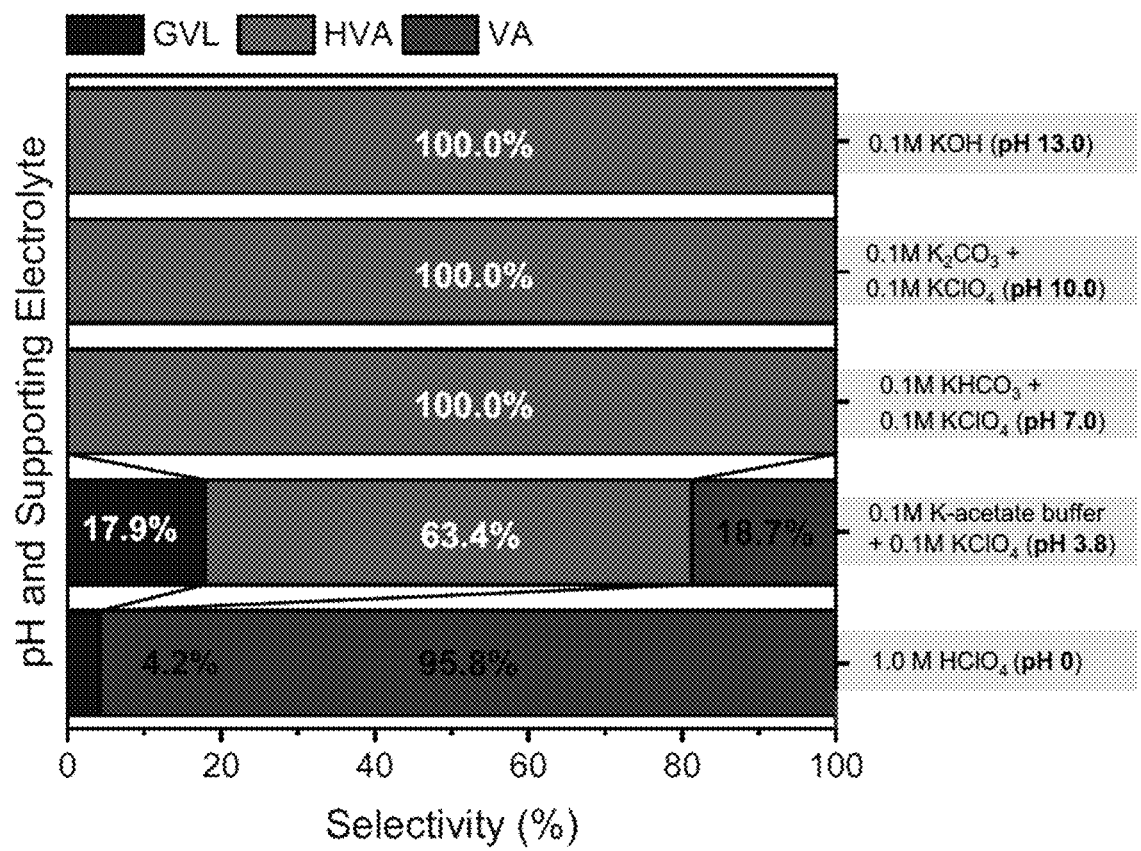
FIG. 16. pH and supporting electrolyte effect on selectivities for electrolyses performed with 0.1 mol $L^{-1}$ levulinic acid, at −1.9 V vs. RHE, for 4 F/mol of levulinic acid. VA: valeric acid, HVA: 4-hydroxyvaleric acid, GVL: γ-valerolactone, and FA: formic acid.

FIG. 2 shows faradaic efficiencies for the different levulinic acid reduction products, along with levulinic acid conversions, for electrolyses performed across various pH conditions. Corresponding selectivities (S %, organic conversion basis) can be seen in FIG. 16, and additional electrolysis conditions with other supporting electrolytes can be seen in Table 1 (Entries 1-10). Mass balances for all electrolyses were above 95%, meaning that levulinic acid and its reduction products do not easily cross the ion-exchange membranes and all major products were identifiable. For bicarbonate- and carbonate-containing electrolytes, a small portion of the current (<3%) was lost through the formation of formic acid (FA) from electrochemical reduction of $CO_2$. This comes from a slow equilibrium conversion of carbonate species to $CO_2$—cells were always thoroughly purged before electrolysis [29].

TABLE 1

Electrolysis conditions, faradaic efficiency, levulinic acid reduction (LAR) selectivity, average partial current for levulinic acid reduction, and total current for experiments.

| Entry | Conditions | Faradaic Efficiency (%) | LAR selectivity (%) | Conversion (%) | Average partial current density for LAR (mA cm$^{-2}$) | Total current density (mA cm$^{-2}$) | Electrolysis Time (min) |
|---|---|---|---|---|---|---|---|
| | | | pH effect | | | | |
| 1[a] | SE: 0.5M H$_2$SO$_4$ (pH ~0) | VA: 71.3 GVL: 2.3 HVA: 0 H$_2$: 24.9 | VA: 93.8 GVL: 6.16 HVA: 0 | 75.9 | 143.7 | 195.2 | 16.5 |
| 2[a] | SE: 0.5M H$_2$SO$_4$ + 0.1M KClO$_4$ (pH ~0) | VA: 71.1 GVL: 3.1 HVA: 0 H$_2$: 25.5 | VA: 92.0 GVL: 8.0 HVA: 0 | 77.3 | 144.9 | 195.3 | 16.5 |
| 3[a] | SE: 1.0M HClO$_4$ (pH ~0) | VA: 69.8 ± 0.1 GVL: 1.5 ± 0.1 HVA: 0 H$_2$: 23.3 ± 1.2 | VA: 95.8 ± 0.2 GVL: 4.20 ± 0.1 HVA: 0 | 72.9 | 145.6 ± 1.2 | 204.2 ± 1.7 | 15.8 ± 0.1 |
| 4[a] | SE: 0.1M potassium acetate buffer + 0.1M KClO$_4$ (pH 3.8) | VA: 7.5 GVL: 3.6 HVA: 12.7 H$_2$: 75.9 | VA: 18.7 GVL: 18.0 HVA: 63.4 | 40.1 | 12.3 | 51.7 | 62.2 |
| 5[a] | SE: 0.1M KHCO$_3$ + 0.1M KClO$_4$ (pH 7) | HVA: 47.1 H$_2$: 51.8 | HVA: 100 | 94.2 | 7.8 | 16.6 | 193.7 |
| 6[a] | SE: 0.1M KHCO$_3$ (pH 7) | HVA: 38.7 H$_2$: 58.8 | HVA: 100 | 77.4 | 5.0 | 12.9 | 249.3 |
| 7[a] | SE: 0.1M KClO$_4$ (pH$_{initial}$ = 7; pH$_{final}$ = 10) | HVA: 32.2 H$_2$: 65.8 | HVA: 100 | 76.4 | 6.4 | 19.9 | 161.6 |
| 8[a] | SE: 0.1M K$_2$CO$_3$ + 0.1M KClO$_4$ (pH 10) | HVA: 31.9 H$_2$: 66.0 | HVA: 100 | 63.8 | 7.4 | 23.2 | 138.6 |
| 9[a] | SE: 0.1M KOH (pH 13) | HVA: 16.6 H$_2$: 75.9 | HVA: 100 | 33.2 | 2.6 | 15.7 | 204.9 |
| 10[a] | SE: 0.1M KOH + 0.1M KClO$_4$ (pH 13) | Disintegration (cathodic corrosion of electrode) | | | | | |
| | | | Potential and temperature effects | | | | |
| 11[b] | E: −1.9 V vs. RHE | HVA: 56.7 ± 2.1 H$_2$: 41.6 ± 2.5 | HVA: 100 | 56.7 | 8.1 ± 0.3 | 14.3 ± 0.5 | 112.5 ± 3.9 |
| 12[b] | E: −1.7 V vs. RHE | HVA: 49.1 H$_2$: 47.8 | HVA: 100 | 49.1 | 5.9 | 12.0 | 134.0 |
| 13[b] | E: −1.5 V vs. RHE | HVA: 34.0 H$_2$: 59.4 | HVA: 100 | 34.0 | 4.3 | 12.6 | 127.6 |
| 14[b] | E: −1.3 V vs. RHE | HVA: 22.2 H$_2$: 66.9 | HVA: 100 | 22.2 | 2.7 | 12.2 | 131.8 |

TABLE 1-continued

Electrolysis conditions, faradaic efficiency, levulinic acid reduction (LAR) selectivity, average partial current for levulinic acid reduction, and total current for experiments.

| Entry | Conditions | Faradaic Efficiency (%) | LAR selectivity (%) | Conversion (%) | Average partial current density for LAR (mA cm$^{-2}$) | Total current density (mA cm$^{-2}$) | Electrolysis Time (min) |
|---|---|---|---|---|---|---|---|
| 15[b] | E: −1.1 V vs. RHE | HVA: 9.4<br>H$_2$: 72.4 | HVA: 100 | 9.4 | 0.4 | 4.2 | 382.9 |
| 16[c] | E: −1.9 V vs. RHE | HVA: 70.3 ± 2.5<br>H$_2$: 29.7 ± 2.2 | HVA: 100 | 70.3 | 19.0 ± 0.2 | 27.0 ± 0.3 | 59.6 ± 0.7 |
| 17[c] | E: −1.7 V vs. RHE | HVA: 56.5<br>H$_2$: 40.0 | HVA: 100 | 56.5 | 10.3 | 18.2 | 88.4 |
| 18[c] | E: −1.5 V vs. RHE | HVA: 50.6<br>H$_2$: 41.6 | HVA: 100 | 50.6 | 3.3 | 6.52 | 246.6 |
| | | | Cation effect | | | | |
| 19[c] | SE: 0.1M LiHCO$_3$ + 0.1M LiClO$_4$ | HVA: 64.3 ± 2.8<br>H2: 35.7 ± 3.5 | HVA: 100 | 64.3 | 17.7 ± 0.3 | 27.5 ± 0.5 | 58.5 ± 1.1 |
| 20[c] | SE: 0.1M NaHCO$_3$ + 0.1M NaClO$_4$ | HVA: 70.0 ± 2.6<br>H$_2$: 29.0 ± 2.9 | HVA: 100 | 70 | 18.4 ± 0.2 | 26.3 ± 0.3 | 61.1 ± 0.7 |
| 21[c] | SE: 0.1M CsHCO$_3$ + 0.1M CsClO$_4$ | HVA: 62.6 ± 2.4<br>H$_2$: 34.0 ± 2.5 | HVA: 100 | 62.6 | 19.3 ± 0.4 | 30.8 ± 0.6 | 52.2 ± 1.0 |
| | | | Concentration effect | | | | |
| 22[c] | [LA]$_{initial}$ = 0.1M, Q: 0.5 F/mol$_{LA}$ | HVA: 78.3 | HVA: 100 | 78.3 | 21.1 | 26.9 | 59.8 |
| 23[c] | [LA]$_{initial}$ = 0.1M, Q: 1.0 F/mol$_{LA}$ | HVA: 73.5 | HVA: 100 | 73.5 | 19.7 | 26.8 | 60.0 |
| 24[c] | [LA]$_{initial}$ = 0.1M, Q: 1.5 F/mol$_{LA}$ | HVA: 72.4 | HVA: 100 | 72.4 | 19.6 | 27.1 | 59.3 |
| 25[c] | [LA]$_{initial}$ = 0.1M, Q: 2.0 F/mol$_{LA}$ | HVA: 70.3 ± 2.5<br>H$_2$: 29.7 ± 2.2 | HVA: 100 | 70.3 | 19.0 ± 0.2 | 27.0 ± 0.3 | 59.6 ± 0.7 |
| 26[c] | [LA]$_{initial}$ = 0.1M, Q: 2.5 F/mol$_{LA}$ | HVA: 64.8 | HVA: 100 | 64.8 | 17.5 | 27.0 | 59.6 |
| 27[c] | [LA]$_{initial}$ = 0.1M, Q: 3.0 F/mol$_{LA}$ | HVA: 56.3 | HVA: 100 | 56.3 | 15.2 | 27.0 | 59.6 |
| 28[c] | [LA]$_{initial}$ = 0.2M, Q: 0.5 F/mol$_{LA}$ | HVA: 87.4 | HVA: 100 | 87.4 | 79.9 | 91.4 | 17.6 |
| 29[c] | [LA]$_{initial}$ = 0.2M, Q: 1.0 F/mol$_{LA}$ | HVA: 85.9 | HVA: 100 | 85.9 | 78.5 | 91.4 | 17.6 |
| 30[c] | [LA]$_{initial}$ = 0.2M, Q: 1.5 F/mol$_{LA}$ | HVA: 84.8 | HVA: 100 | 84.8 | 77.5 | 91.4 | 17.6 |
| 31[c] | [LA]$_{initial}$ = 0.2M, Q: 2.0 F/mol$_{LA}$ | HVA: 80.0 | HVA: 100 | 80.0 | 73.1 | 91.4 | 17.6 |
| 32[c] | [LA]$_{initial}$ = 0.2M, Q: 2.5 F/mol$_{LA}$ | HVA: 74.5 | HVA: 100 | 74.5 | 68.1 | 91.4 | 17.6 |
| 33[c] | [LA]$_{initial}$ = 0.2M, Q: 3.0 F/mol$_{LA}$ | HVA: 63.6 | HVA: 100 | 63.6 | 58.1 | 91.3 | 17.6 |
| 34[c] | [LA]$_{initial}$ = 0.4M, Q: 0.5 F/mol$_{LA}$ | HVA: 97.4 | HVA: 100 | 97.4 | 108.1 | 111.0 | 14.5 |
| 35[c] | [LA]$_{initial}$ = 0.4M, Q: 1.0 F/mol$_{LA}$ | HVA: 93.4 | HVA: 100 | 93.4 | 103.7 | 111.0 | 14.5 |
| 36[c] | [LA]$_{initial}$ = 0.4M, Q: 1.5 F/mol$_{LA}$ | HVA: 89.9 | HVA: 100 | 89.9 | 99.8 | 111.0 | 14.5 |

TABLE 1-continued

Electrolysis conditions, faradaic efficiency, levulinic acid reduction (LAR) selectivity, average partial current for levulinic acid reduction, and total current for experiments.

| Entry | Conditions | Faradaic Efficiency (%) | LAR selectivity (%) | Conversion (%) | Average partial current density for LAR (mA cm$^{-2}$) | Total current density (mA cm$^{-2}$) | Electrolysis Time (min) |
|---|---|---|---|---|---|---|---|
| 37$^c$ | [LA]$_{initial}$ = 0.4M, Q: 2.0 F/mol$_{LA}$ | HVA: 84.6 | HVA: 100 | 84.6 | 93.9 | 111.0 | 14.5 |
| 38$^c$ | [LA]$_{initial}$ = 0.4M, Q: 2.5 F/mol$_{LA}$ | HVA: 75.9 | HVA: 100 | 75.9 | 84.2 | 111.0 | 14.5 |
| 39$^c$ | [LA]$_{initial}$ = 0.4M, Q: 3.0 F/mol$_{LA}$ | HVA: 64.7 | HVA: 100 | 64.7 | 71.8 | 111.0 | 14.5 |

$^a$Q: 4 F/mol$_{LA}$, E: −.19 V vs. RHE, T: 20° C., and [LA]$_{initial}$ = 0.1M
$^b$Q: 2 F/mol$_{LA}$, T: 20° C., [LA]$_{initial}$ = 0.1M, and SE: 0.1M KHCO$_3$ + 0.1M KClO$_4$ (pH 7)
$^c$same as "b," but T: 50° C.

Figure 17:
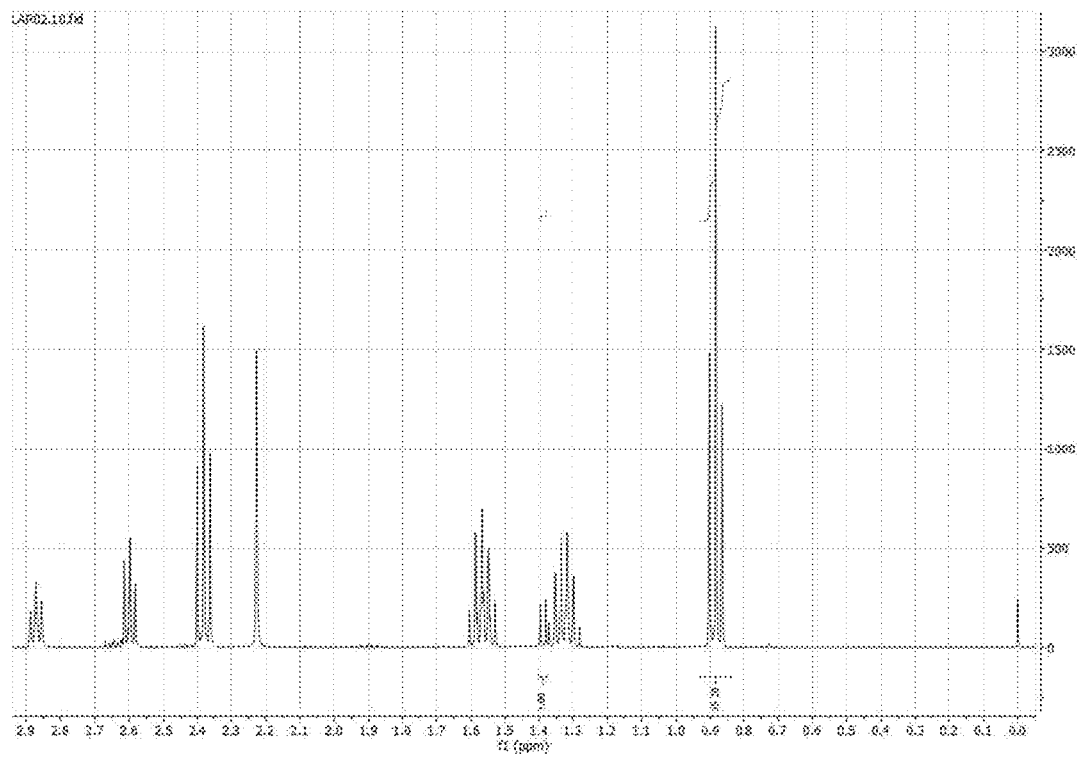
FIG. 17. $^1$H NMR spectrum for electrolysis performed in 0.5 M $H_2SO_4$ at −1.9 V vs. RHE, for 4 F/mol of levulinic acid.
Figure 18:
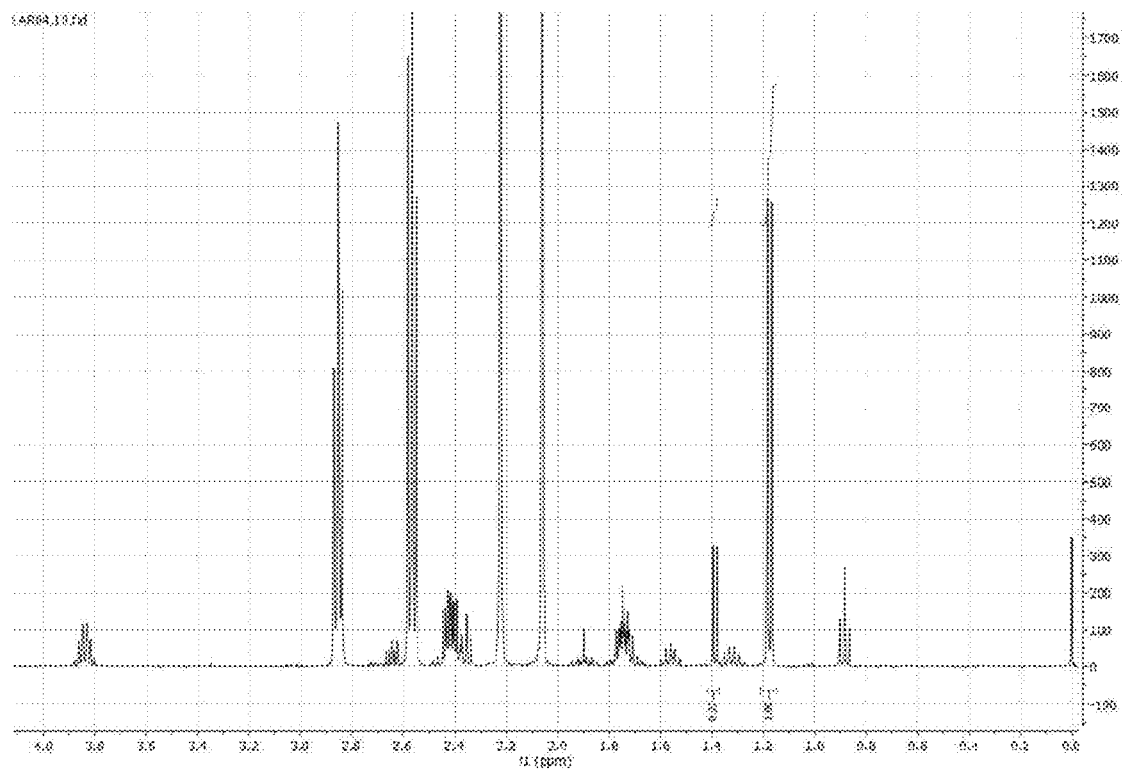
FIG. 18. $^1$H NMR spectrum for electrolysis performed in 0.1 M acetate buffer+0.1 M $KClO_4$ at −1.9 V vs. RHE, for 4 F/mol of levulinic acid.
Figure 19:
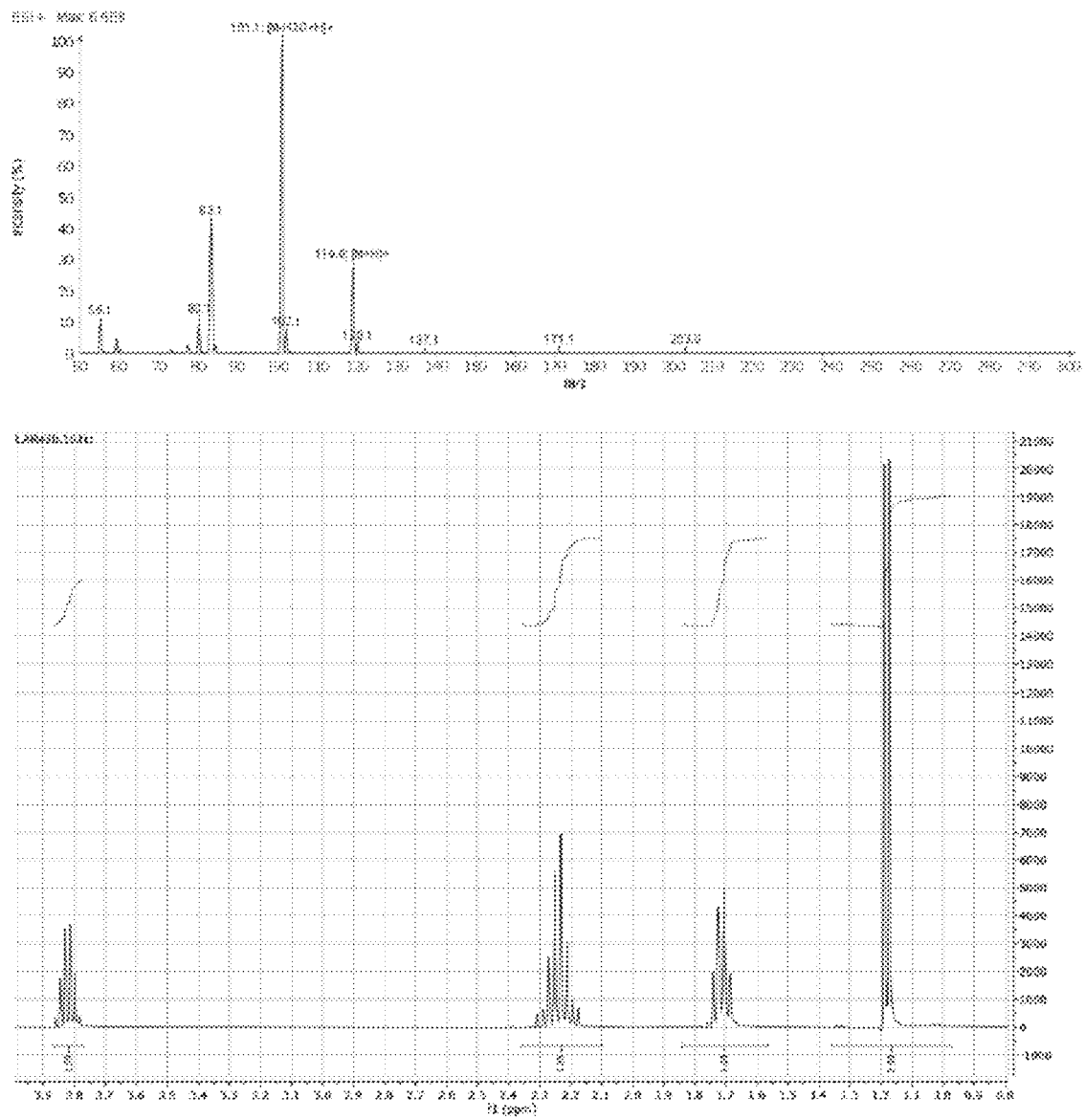
FIG. 19. Top: Positive electrospray ionization mass spectrometry and Bottom: $^1$H NMR spectra of 4-hydroxyvaleric acid obtained from the electrolysis of 0.4 M levulinic acid at optimized conditions. The molecular ion, [HVA+$H^+$], found was 119.0 m/z (while the calculated value is 119.1 m/z, <0.1% error), and the integration of hydrogens in $^1$H-NMR spectrum showed only 3% error compared to the values expected. These results also exclude the presence of 4-hydroxyvaleric acid dimer (Pinacol-HVA, which has double mass and does not have hydrogen at δ 3.82 ppm ($^1$H NMR, 400 MHz, $H_2O$+10 w. % $D_2O$, water suppression).

In 1.0 M HClO$_4$ (pH ~0), the faradaic efficiency toward valeric acid was nearly 70%, with trace γ-valerolactone production and overall conversion above 80%. For comparison, similar electrolyses with 0.5 M H$_2$SO$_4$ (pure, and with a perchlorate containing co-supporting electrolyte: 0.5 M H$_2$SO$_4$+0.1 M KClO$_4$) showed virtually identical results (FIG. 17 and Table 1, Entries 1-3). This suggests that the anions have a low impact on the mechanism for the formation of valeric acid and γ-valerolactone and that alkali cations do not strongly compete with H$^+$ and levulinic acid for Pb surface sites (at this pH). When the pH was increased to 3.8, the total faradaic efficiency for levulinic acid reduction decreased, and the selectivity shifted dramatically to just 18.7% valeric acid, with 17.9% γ-valerolactone production and 63.4% 4-hydroxyvaleric acid appearing ($^1$H NMR spectrum shown in FIG. 18). At pH 7 and above, valeric acid and γ-valerolactone were not detected, and, using mass spectrometry and $^1$H-NMR, it was possible to prove that each neutral-to-alkaline condition produces 4-hydroxyvaleric acid with >99.9% selectivity (FIG. 19). These results also exclude the presence of 4-hydroxyvaleric acid dimer (Pinacol-HVA).

Since 4-hydroxyvaleric acid has not previously been observed in this reaction, it is prudent to consider the likely mechanistic pathways governing levulinic acid reduction selectivity. Based on the observed pH trends, it is proposed that the formation of valeric acid and γ-valerolactone occurs through a surface-mediated mechanism, while 4-hydroxyvaleric acid is formed mainly via an outer sphere electron transfer (OSET) route, favored at higher pH (above the pKa of levulinic acid), as presented in FIG. 3. An electromediated mechanism involving solution phase Pb-species is also possible (discussed further below). The first discriminating factor to be considered is that, near pH 0, a portion of levulinic acid molecules will be protonated at the ketonic-carbonyl oxygen. Neutral levulinic acid (and/or its enol form) may also react, but evidence has been presented by several authors [10,30] that the cationic form of aliphatic ketones (here LA-H$^+$) promotes electrostatic adsorption on the cathode surface (intermediate a*) under the influence of the electric field below the potential of zero charge (PZC). The local concentration of protons at the surface may also be enriched and drive equilibrium toward LA-H$^+$, though this depends on the rate of reaction and presence of other cations (here K$^+$ addition did not impact the rate, as noted above). Even if the population of LA-H$^+$ is very low, the mechanism can in principle proceed due to rapid acid-base equilibrium being maintained as this protonated form is consumed. The rate of adsorption of these species effectively balances with the adsorption of protons and allows good competition against the parallel hydrogen evolution reaction (HER), making the total faradaic efficiency for reduction of levulinic acid the highest across all pH conditions.

Thus, it is expected that intermediate a* is electrochemically reduced to chemically adsorbed intermediate b* (bound by the former carbonyl carbon), which can further be reduced to 4-hydroxyvaleric acid or protonated at the alcohol group to form intermediate c*. The alcohol protonation will be much more favorable than carbonyl protonation, and thus regardless of whether LA-H$^+$ or neutral levulinic acid initially react, the predominant pathway in strong acid is apparently through intermediate c*, as it should terminate with hydrodeoxygenation to form valeric acid under a well-known Clemmensen reduction mechanism (several steps are not shown in the scheme) [31]. Any 4-hydroxyvaleric acid that forms (from b*) should be immediately converted to γ-valerolactone via acid-catalyzed, homogeneous, intramolecular esterification (lactonization), explaining why 4-hydroxyvaleric acid is not detected in strong acid but appears alongside γ-valerolactone at pH 3.8. Under the milder acidic conditions, cationic LA-H$^+$ species will cease to be present, but the neutral levulinic acid molecule can still adsorb and form intermediate b* (by 1e$^-$ reduction). Since valeric acid formation should still require acid-catalyzed hydrodeoxygenation of intermediate c*, this pathway is diminished at less acidic pH. Combined with slower homogeneous conversion of 4-hydroxyvaleric acid into γ-valerolactone, all three products are detected in weak acid with 4-hydroxyvaleric acid predominating.

Figure 23:
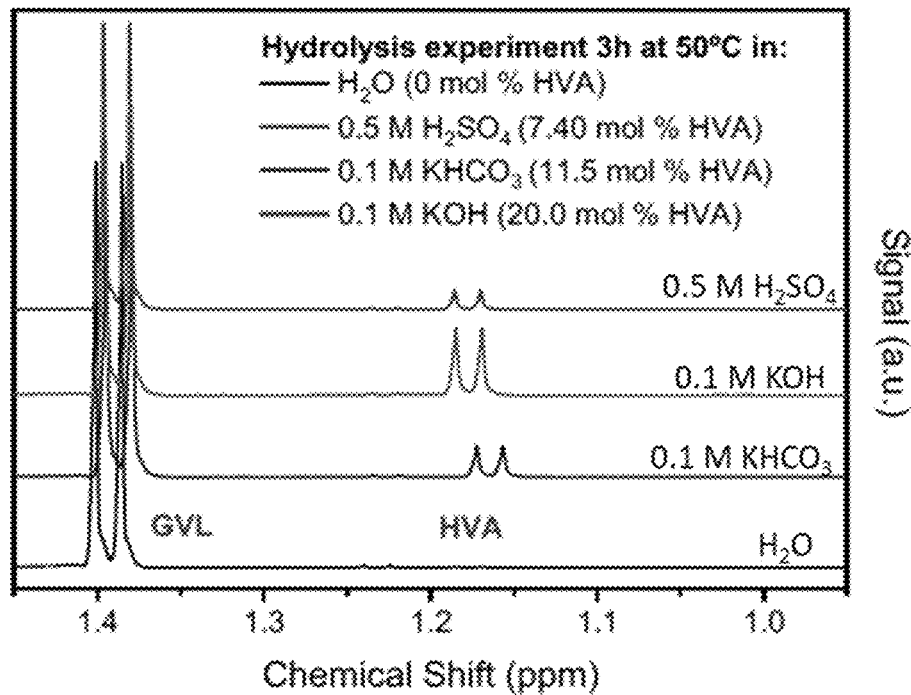
FIG. 23. $^1$H-NMR spectra for hydrolysis experiment: 0.1 mol $L^{-1}$ γ-valerolactone solutions were prepared in different supporting electrolytes [0.5 mol $L^{-1}$ $H_2SO_4$ (pH 0), pure $H_2O$ (pH 7), 0.1 mol $L^{-1}$ $KHCO_3$+0.1 mol $L^{-1}$ $KClO_4$ (pH 7), and in 0.1 mol $L^{-1}$ KOH (pH 13)], kept at 50° C. for 3 h.

Shifting to the pH window from 7 to 13 (above the pKa of levulinic acid, 4.6), it is not expected that levulinate ions (LA$^-$) can adsorb on the electrode since it bears a strong negative charge—the operating potential of −1.9 V vs. RHE at pH 7 is >1.6 V more negative than the potential of zero charge for lead electrodes (about −0.7 V vs. SHE) [32], and even more so at higher pH. Since reduction does in fact proceed, it can be expected that either neutral levulinic acid—continually restored near the surface by acid-base equilibrium—adsorbs, or alternatively, the charge screening by alkali cations present in the Helmholtz layer is sufficient to permit LA⁻ a close enough approach to the surface to be reduced via outer sphere electron transfer. Predominance of solution phase reduction is proposed herein for two reasons: (i) unlike the case of LA-H⁺, the minority neutral molecule is not actively driven to the surface by the electric field, and (ii) no dimeric species are formed. Reduction and protonation of LA⁻ would yield a 4-hydroxycarboxylic radical (intermediate d*), which can be further reduced and protonated to 4-hydroxyvaleric acid. It is common in the electrochemical reduction of ketones and aldehydes for radicals such as intermediate d* to dimerize in neutral or alkaline environments, forming a pinacol product (vicinal diol) [10]; however, the anionic and solvated nature of intermediate d* can create repulsion, whereas neutral adsorbed intermediates would be expected to show some dimer yield. Thus, the reactivity is attributed to solution-phase LA⁻. Extra non-electrochemical control experiments (cf. Supporting Information, "Homogeneous hydrolysis of GVL," FIG. 23) were also used to verify that γ-valerolactone cannot be hydrolyzed to 4-hydroxyvaleric acid under the experimental conditions used for these electrolyses, confirming that 4-hydroxyvaleric acid is formed directly and terminally.

Figure 20:
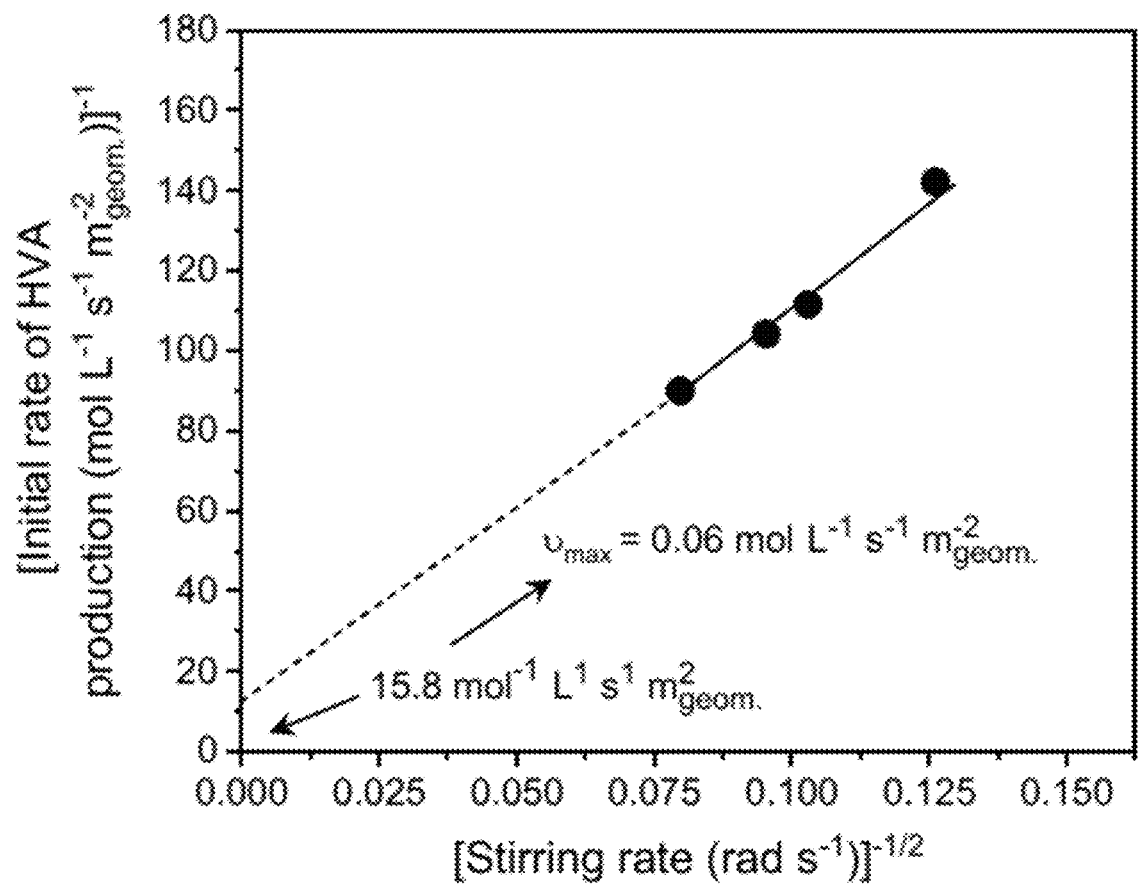
FIG. 20. The inverse of initial rates of 4-hydroxyvaleric acid production as a function of the inverse of the square-root of stirring rate for electrolyses carried out with 0.5 F/mol of levulinic acid (<25% conversion), in 0.1 M $KHCO_3$+0.1 M $KClO_4$ and $[LA]_{initial}$=0.1 mol $L^{-1}$, at −1.3 V vs. RHE. and 20° C. In addition to the general observation that rates always increased with faster stirring (up to experimental limits), the scaling with inverse square root of stirring rate suggests formation of a typical mass-transfer boundary layer across the electrode surface and predominance of diffusion control. (To a rough approximation, the boundary layer thickness for flow over a plate scales with Reynolds number as $Re^{-1/2}$, and Re∝ω in a stirred tank). Contributions from migration of organic ions are not completely negligible (the transference number for levulinic acid—is estimated to be ~10% under the optimized electrolysis conditions), and the extrapolated kinetic current cannot be considered quantitatively, but this nonetheless shows a predominance of diffusion resistance. Inherently, mass transfer control should remain in effect at more negative potentials (higher overpotentials) and higher temperatures.

Interestingly, increasing the pH in the neutral-to-alkaline regime caused a continual decrease in $FE_{HVA}$, favoring the hydrogen evolution reaction via $H_2O$ reduction. In principle, several effects could play a role, and their relative importance likely varies with increasing pH. It should first be noted that even with the highest practical stirring rates, the reaction operated in a regime with significant influence from mass transfer with respect to levulinic acid under most experimental conditions (see FIG. 20 for characterization with variable stirring rates and discussion of mass transfer). This was always the case for pH conditions that were selective to 4-hydroxyvaleric acid, and thus it is emphasized that the reported data should be interpreted in this context. The rate of hydrogen evolution reaction is well known to increase moving from neutral to alkaline pHs for a given potential vs. RHE (overpotential thus increasing on an SHE scale) and to remain controlled by kinetics due to water acting as the proton source in these conditions [33,34]. This reaction becomes increasingly predominant as pH rises, while it was found that the partial current to levulinic acid reduction stays roughly constant moving from pH 7 to 10 (consistent with reaching mass transfer limitation), lowering the faradaic efficiency. However, the total current and levulinic acid reduction current both decrease at pH 13 (c.f. Table 1), and it is important to recall that under these extremely cathodic conditions, Pb electrodes can undergo several additional side reactions.

First, alkali cations can be electrodeposited onto/into Pb surface, forming Pb-alkali amalgams (Eq. 1). This is a century-old phenomenon known as implantation [35-37] and is also observed for electrodes such as In, Ga, Hg, and Sn, among others [38]. Second, Pb electrodes can form hydrides at these very negative potentials (Eq. 2) [36]. Both phenomena (alkali implantation and hydride formation) further cause electrode lixiviation or disintegration [35-37], schematized in Eqs. 3, 4, and 5. These processes consume 1F per mol of Pb-alkali amalgam or 2F per mol of $PbH_2$ and generate an equivalent amount of $H_2$ (still accounted in total faradaic efficiency); this can contribute to decreases in $FE_{LAR}$ as pH rises, although a drop in total current at high pH suggests that all pathways are altered and the parasitic pathways are not simply additive with the main faradaic reactions. It was found that disintegration was accelerated with visible colloidal Pb forming when the concentration of alkalis was increased at pH 13 by adding 0.1 mol L⁻¹ $KClO_4$ to the 0.1 M KOH electrolyte (cf. Entry 10-Table 1). This supports the suggestion that the faradaic efficiency becomes significantly influenced by parasitic pathways mediated by Pb-electrolyte interactions at high pH.

$$M^+_{(aq)} + Pb_{(s)} + 1e^- \rightarrow (M)Pb_{(s)} \qquad \text{Eq. 1}$$

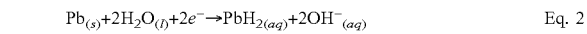
$$Pb_{(s)} + 2H_2O_{(l)} + 2e^- \rightarrow PbH_{2(aq)} + 2OH^-_{(aq)} \qquad \text{Eq. 2}$$

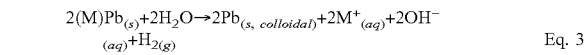
$$2(M)Pb_{(s)} + 2H_2O \rightarrow 2Pb_{(s,\ colloidal)} + 2M^+_{(aq)} + 2OH^-_{(aq)} + H_{2(g)} \qquad \text{Eq. 3}$$

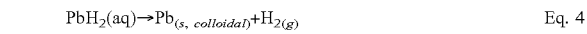
$$PbH_2(aq) \rightarrow Pb_{(s,\ colloidal)} + H_{2(g)} \qquad \text{Eq. 4}$$

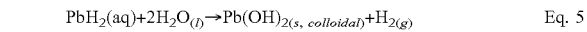
$$PbH_2(aq) + 2H_2O_{(l)} \rightarrow Pb(OH)_{2(s,\ colloidal)} + H_{2(g)} \qquad \text{Eq. 5}$$

Figure 3:
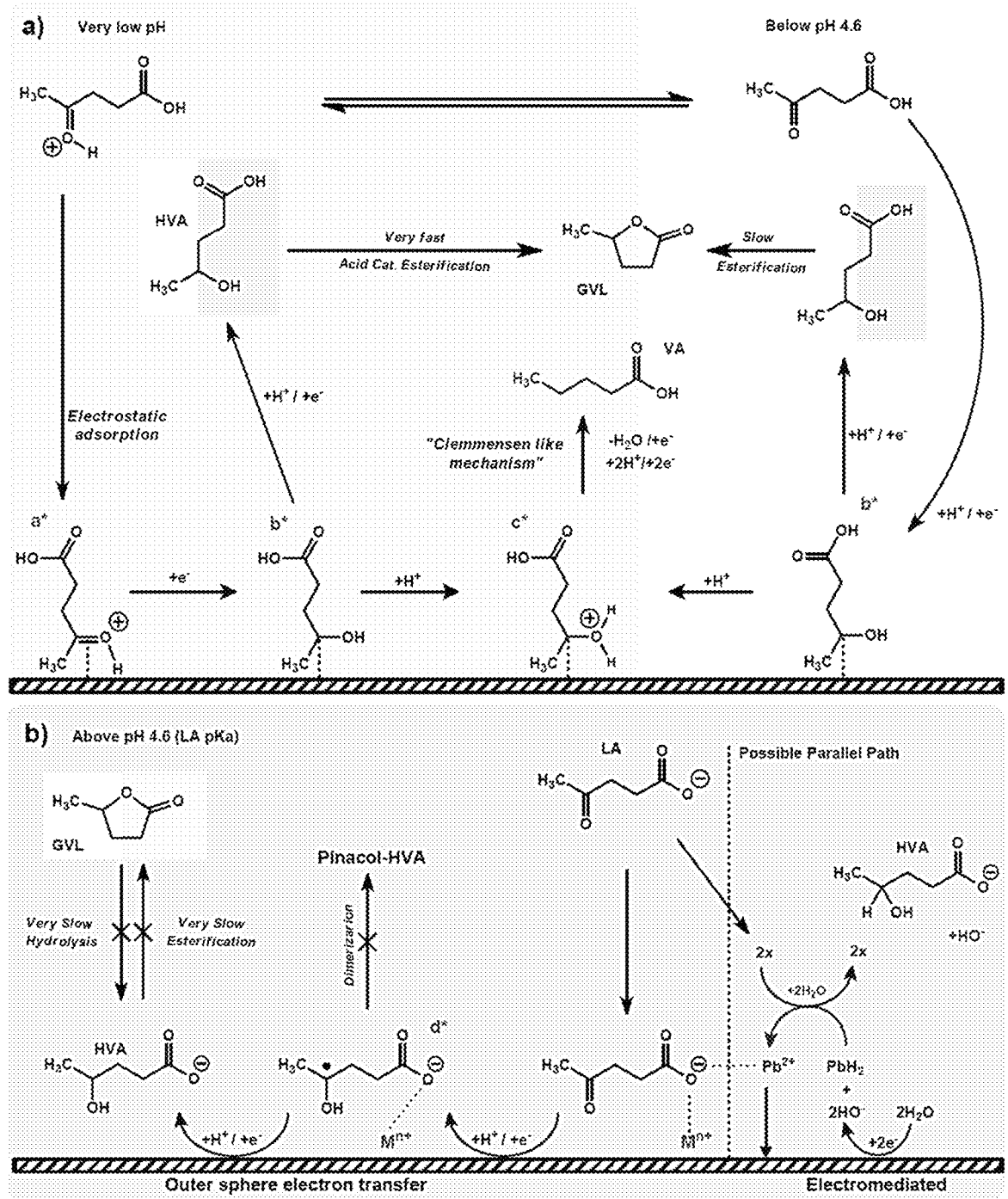
FIG. 3. Levulinic acid (LA) reduction reaction: proposed routes for the formation of valeric acid (VA), 4-hydroxyvaleric acid (HVA), and γ-valerolactone (GVL). Mechanisms are shown for pH below (a) and above (b) the levulinic acid pKa ~4.6. $Mn^+$=electrostatically adsorbed cation.

Aside from mediation of hydrogen evolution reaction, it is possible that $PbH_2$ molecules would also mediate the reduction of levulinic acid (as shown in FIG. 3). After formation of Pb(II) hydride from $Pb^0$ (2e⁻ per mol, Eq. 2), each hydride moiety (H⁻) would promote the reduction of levulinic acid to 4-hydroxyvaleric acid (forming 2 4-hydroxyvaleric acid molecules by transfer of 2e⁻ each). The resulting $Pb^{2+}$ ions would then be electrodeposited back as $Pb^0$, closing the electromediation cycle. The formation of two 4-hydroxyvaleric acid molecules would involve a total transfer of 4e⁻ and remain accounted in the faradaic efficiency. To understand the possible interplay with such effects at more practically-relevant conditions, the potential dependence at neutral pH is discussed next.

Figure 4:
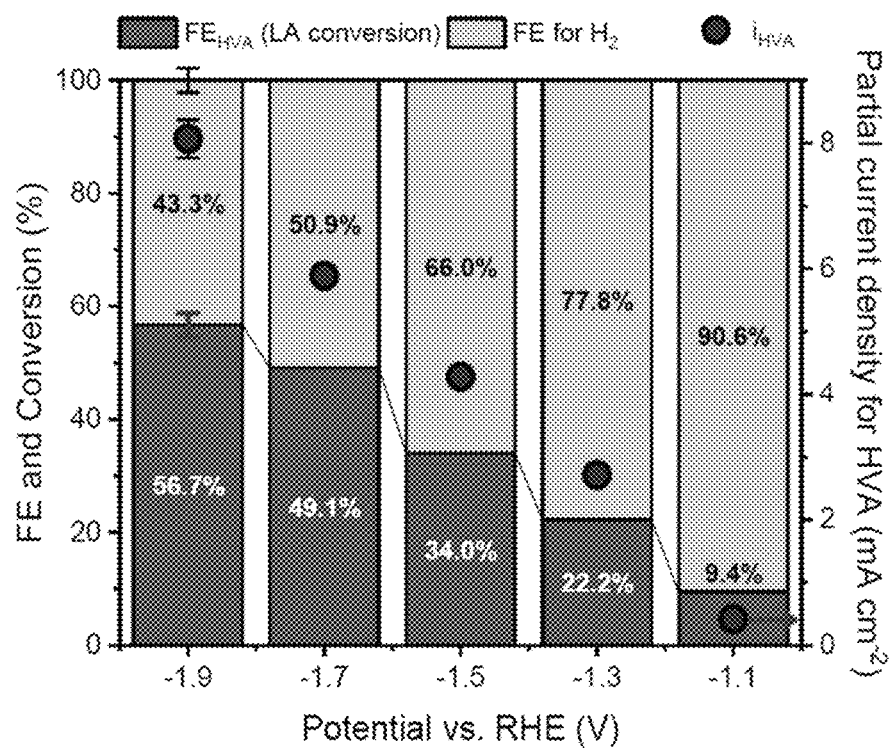
FIG. 4. Effect of potential for electrolyses carried out in 0.1 M $KHCO_3$+0.1 M $KClO_4$ at 20° C., and with total charge of 2 F/mol of levulinic acid. Since 4-hydroxyvaleric acid is the only organic product, conversion for levulinic acid and faradaic efficiency for 4-hydroxyvaleric acid are numerically equal.
Figure 21:
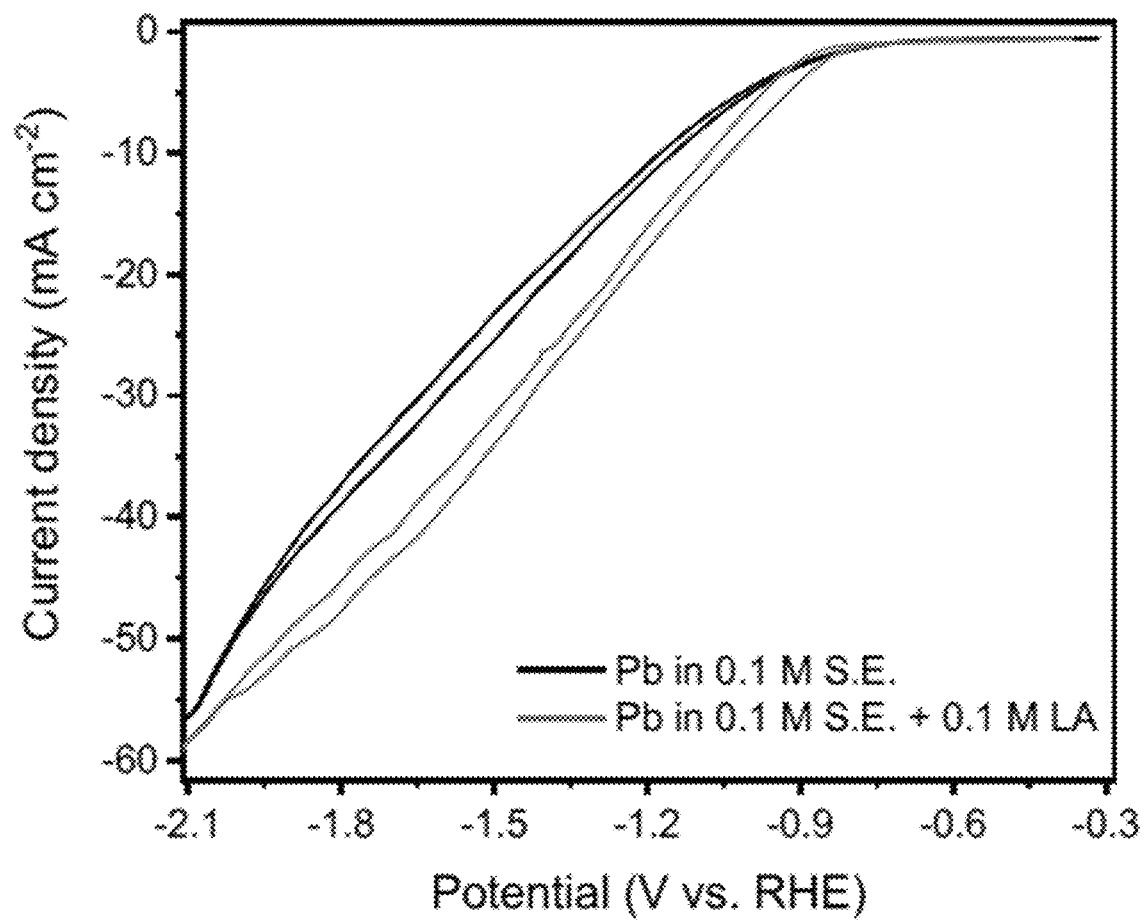
FIG. 21. Cyclic voltammograms of Pb electrode in 0.1 M $KHCO_3$+0.1 M $KClO_4$ (pH 7), with and without 100 mM levulinic acid at a scan rate of 50 mV $s^{-1}$ and 20° C.

Potential effects. Focusing on the most ideal pH condition for 4-hydroxyvaleric acid formation (pH 7), the effects of potential were evaluated to further understand and optimize the factors governing faradaic efficiency (FIG. 4). Cyclic voltammetry studies in 0.1 M $KHCO_3$+0.1 M $KClO_4$ with and without 100 mM levulinic acid (shown in Supporting Information, FIG. 21) showed that levulinic acid reduction becomes significant at potentials more negative than c.a. −0.9 V vs. RHE. The presence of levulinic acid also appeared to have a partial inhibitory effect on disintegration, as continued cycling to −1.9 V was stable in levulinic acid, but without levulinic acid led to formation of a white colloid (possibly lead hydroxide, Eq. 5), which eventually became dark-gray (lead hydroxide conversion to $PbO_2$ or colloidal Pb formed from $PbH_2$). When extending to more negative potentials (lower than −1.9 V) the disintegration products were observed regardless of the presence of levulinic acid. Thus, operating potentials from −1.1 V to a limit of −1.9 V vs. RHE were focused on to evaluate the influence on $FE_{HVA}$ and rate of 4-hydroxyvaleric acid production ($i_{HVA}$). This is shown in FIG. 4 (now, using 2F/mol$_{LA}$ since 4-hydroxyvaleric acid is the only major product).

Figure 22:
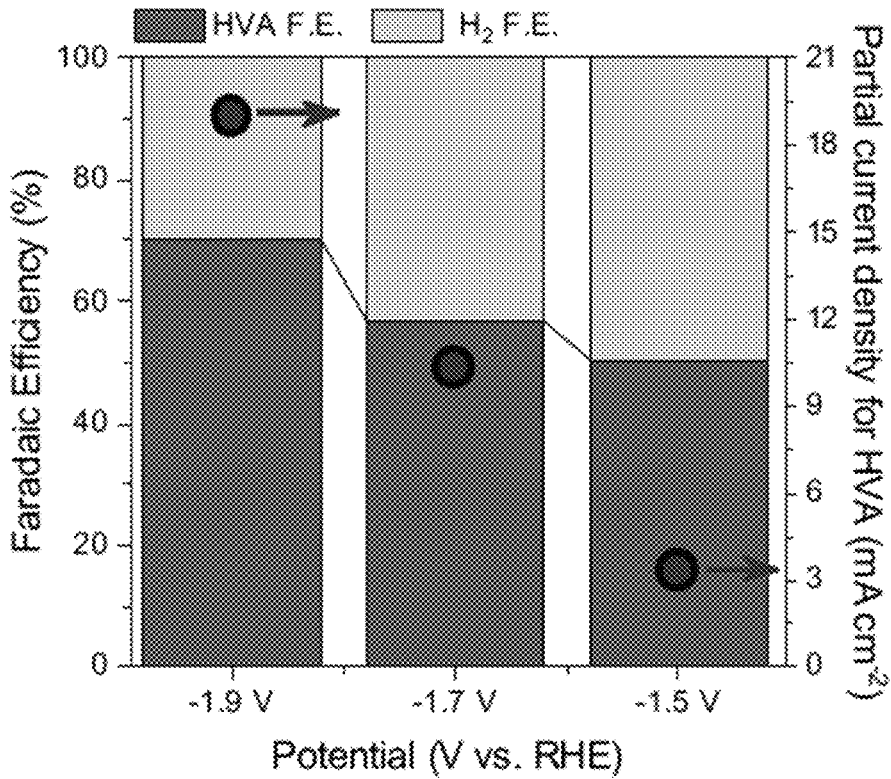
FIG. 22. Potential effect for electrolyses carried out at 50° C., with 2 F/mol of levulinic acid in 0.1 M $KHCO_3$+0.1 M $KClO_4$.

It was observed that $FE_{HVA}$ and $i_{HVA}$ both linearly increased toward more negative potentials, though with an almost constant total average current (total including hydrogen evolution reaction) from −1.3 V out to −1.9 V (cf. Table 1). A similar trend was also observed at 50° C. (FIG. 22). Given that the transition toward mass transfer limitation of levulinic acid reduction is already observable at small overpotentials and lower temperature conditions (FIG. 20), this collective behavior suggests some additional effects that are not captured in a typical reaction-diffusion framework with Butler-Volmer type kinetics. It is suggested that there is a mixture of effects, possibly related to implantation and hydride formation reactions changing the surface and electronic structure of the electrode and/or leading to increase of the electromediated path in parallel. Changes to double layer structure and solvent dynamics influencing hydrogen evolution reaction are also possible, though these are less likely to influence the levulinic acid reduction if it is already fully transport-limited.

Figure 5:
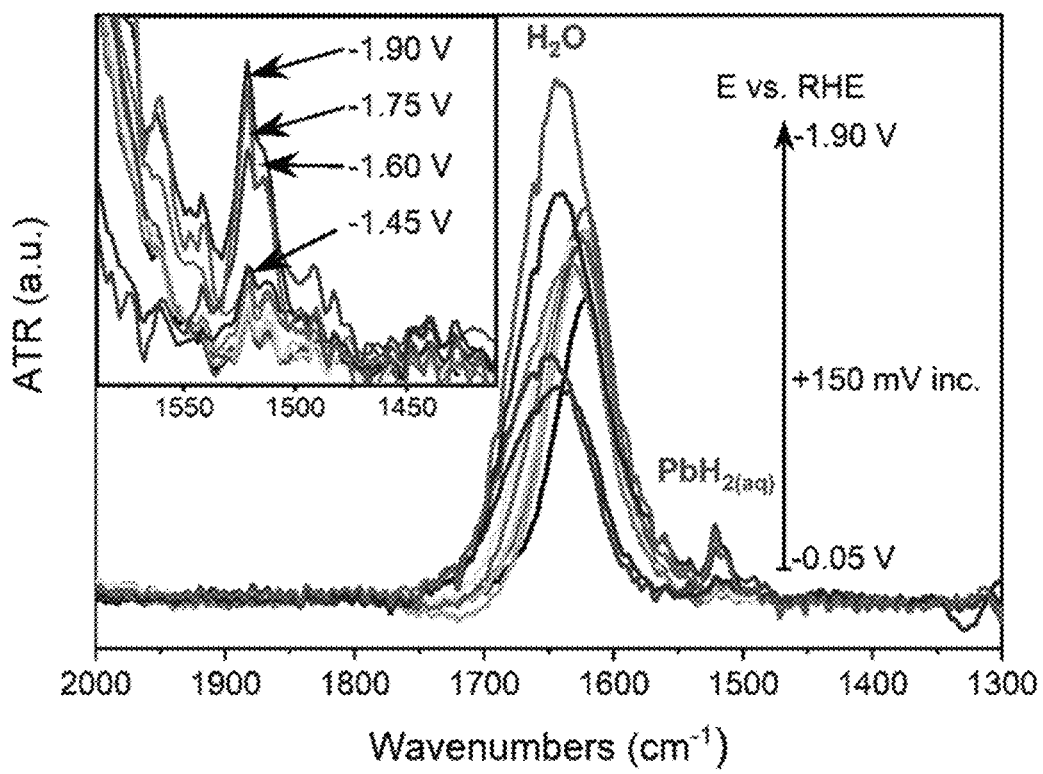
FIG. 5. In situ ATR-FTIR spectra for Pb film polarized at different potentials from −0.05 V to −1.90 V vs. RHE, with steps of 150 mV, in 0.1 M $KHCO_3$+0.1 M $KClO_4$ at 20° C.

Concerning the possibility of an electromediated path for levulinic acid reduction, it is known that the standard thermodynamic potential for formation of $PbH_2$ (i.e. at unit activity) is −1.92 V vs. RHE in pH 7.40. Per the Nernst equation, it could be expected that $PbH_2$ may begin forming under significantly less negative potentials. To assess the electrochemical formation of $PbH_2$ at the relevant conditions, in situ ATR-FTIR spectra were collected for a Pb thin film electrode sequentially polarized from −0.05 to −1.90 V vs. RHE in the absence of levulinic acid (FIG. 5). This experiment shows the formation of (detectable) lead hydride starting around −1.60 V vs. RHE, evidenced by the appearance of a peak at about 1520 $cm^{-1}$ associated with a Pb—H stretch. Based on the abrupt growth in IR intensity, it might be inferred that if $PbH_2$ mediation were becoming the main route for reduction of levulinic acid, an abrupt increase in rate and faradaic efficiency would also be expected toward more negative potentials. On the other hand, mass transfer effects could obscure such behavior. It is suggested that, since the formation of 4-hydroxyvaleric acid is already observed at 0.5 V smaller overpotential than $PbH_2$ is observed (corresponding to orders of magnitude slower $PbH_2$ production), that the electromediation mechanism represents at most a parallel contribution to 4-hydroxyvaleric acid formation, alongside the outer sphere electron transfer path. Decomposition and/or hydrolysis of $PbH_2$ would likely be faster than mediated levulinic acid reduction (a second order process), and thus continual improvement in the faradaic efficiency at larger overpotentials would not be expected if this path accounted for the dominant portion of current. Conversely, a final possibility could be that the presence of $Pb^{2+}$ formed in solution during mediation events could make complexes with $LA^-$ (e.g. $[LA-Pb]^+$) and thus drive an additional levulinic acid toward the electrode for reduction by outer sphere electron transfer.

Impact of temperature, cation, and initial concentration. Several additional operating variables were investigated and found to have notable, though less decisive effects on the production of 4-hydroxyvaleric acid (holding optimized pH and potential fixed). First, the impact of temperature was investigated. Upon increasing temperature from 20° C. to 50° C., it was observed that both reaction rates (levulinic acid reduction and hydrogen evolution reaction) increased by roughly a factor of two (FIG. 6), with the levulinic acid reduction increasing slightly more and raising the faradaic efficiency to 4-hydroxyvaleric acid from 55% to 70%. Given an array of competing effects, the source of improved faradaic efficiency can presently only be speculated. The apparent activation barrier associated with hydrogen evolution reaction kinetics is evidently lower than that associated with the mass transfer coefficient of levulinic acid. This could make sense in the context that the rate of water reduction far below electrode potential of zero charges has been suggested to become governed by the dynamics of solvent reorganization rather than the rate of electron transfer [41]. Other effects related to double layer structure or the local permittivity may also be involved.

Figure 6:
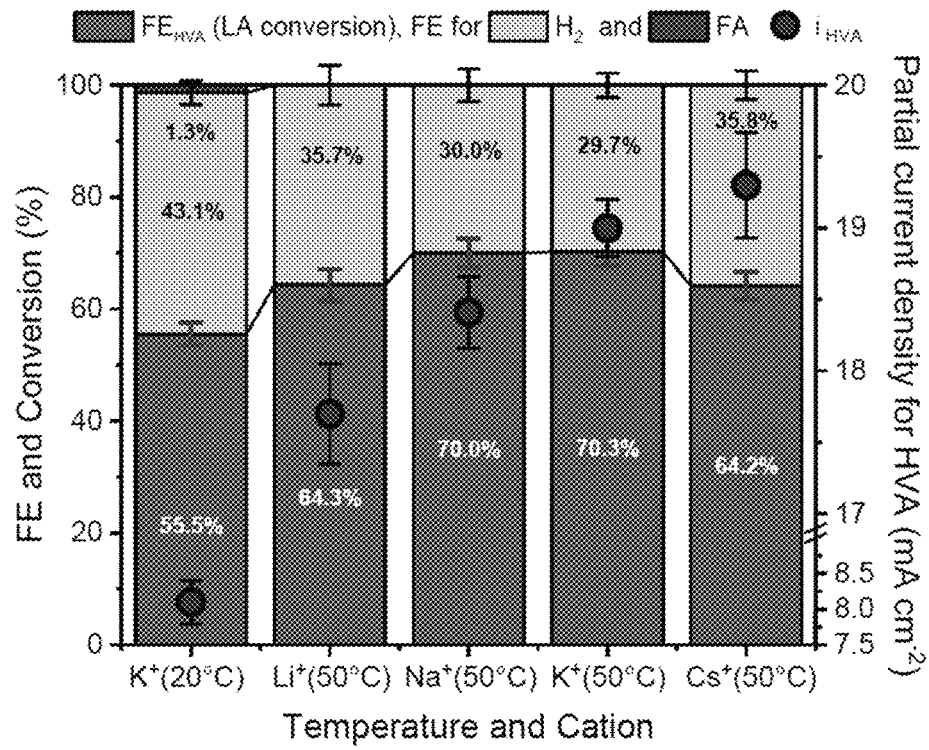
FIG. 6. Temperature and cation effects. Faradaic efficiencies, product distribution, levulinic acid conversion, and partial current density for 4-hydroxyvaleric acid formation ($i_{HVA}$). Electrolysis performed in 0.1 M $MHCO_3$+0.1 M $MClO_4$ (pH 7, where M=$Li^+$, $Na^+$, $K^+$, and $Cs^+$), at 20° C. or 50° C., and with total charge of 2 F/mol of levulinic acid. Since 4-hydroxyvaleric acid is the only organic product, conversion for levulinic acid and faradaic efficiency for 4-hydroxyvaleric acid are numerically equal.

Next, the influence of cations on levulinic acid reduction was evaluated. As can be seen in FIG. 6, the rate of 4-hydroxyvaleric acid formation increases in inverse proportion to the size of hydrated cation in the order $Cs^+>K^+>Na^+>>Li^+$. The effect is small but is noteworthy as the $FE_{HVA}$ does not follow the same trend—a slight maximum is instead found with $Na^+$ and $K^+$ cations. Recalling that virtually all levulinic acid molecules are deprotonated at this pH, screening effects or more specific interactions in the double layer may play a role (to the small extent that kinetics may still be relevant). It is known that $Cs^+$, having the smallest hydrated radius (and thus the highest surface density of cations), creates the most compact double layer potential profile, while $Li^+$ screens the electrode potential least effectively [42,43]; levulinate ions may thus be electrostatically stabilized closer to the electrode in the presence of $Cs^+$. Similar effects are also commonly observed and understood for outer sphere electron transfer reactions between two anionic complexes [43]. At the same time, smaller hydrated cations are also generally associated with suppression of hydrogen evolution reaction [44], and thus the decrease observed in $FE_{HVA}$ when moving toward $Cs^+$ suggests an additional competing effect. The leveling off of faradaic efficiency for $K^+$ and downward shift with $Cs^+$ is likely caused by their implantation in Pb, which was established earlier to decrease faradaic efficiency and which is known to be preferred with the trend $Cs^+>K^+\sim Na^+>Li^+$[35-37]. $Cs^+$ implantation is particularly favorable due to the large difference in electronegativity between Cs and Pb, as well as their similar atomic radii [45]. Formation of $PbH_2$ and subsequent mediated mechanisms may also be promoted on heavily implanted electrodes.

Figure 7:
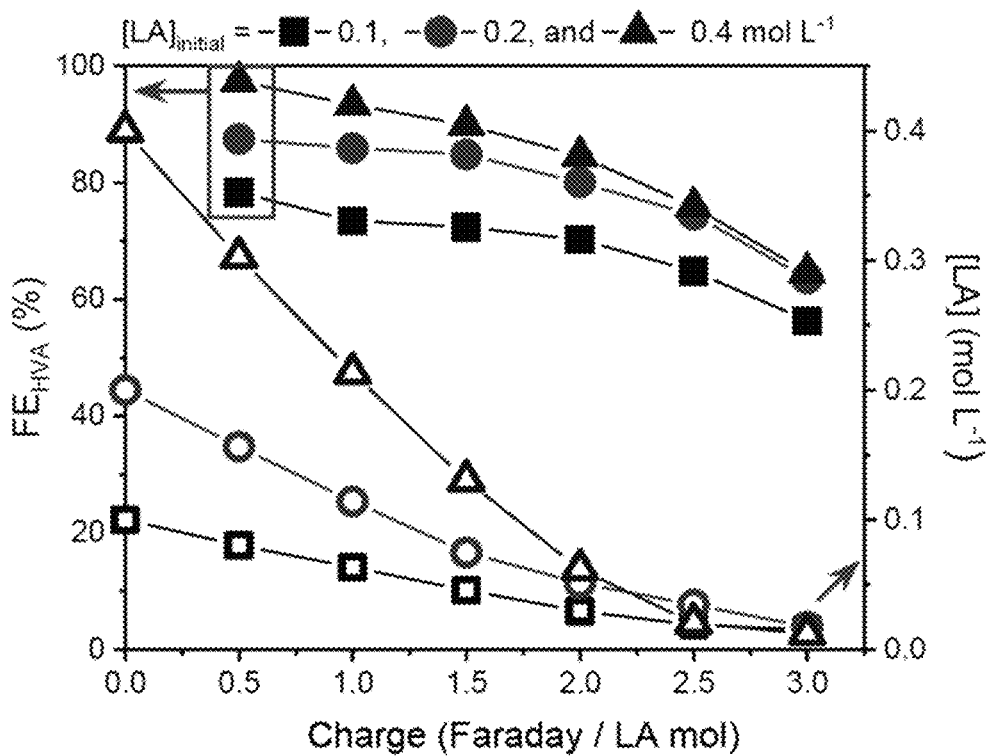
FIG. 7. Effect of initial concentration of levulinic acid ($[LA]_{initial}$). Faradaic efficiency and concentration of levulinic acid vs. charge passed for $[LA]_{initial}$=0.1 mol $L^{-1}$, 0.2 mol $L^{-1}$, and 0.4 mol $L^{-1}$ during electrolyses carried out in 0.1 M $KHCO_3$+0.1 M $KClO_4$, at −1.9 V vs. RHE and 50° C.
Figure 8:
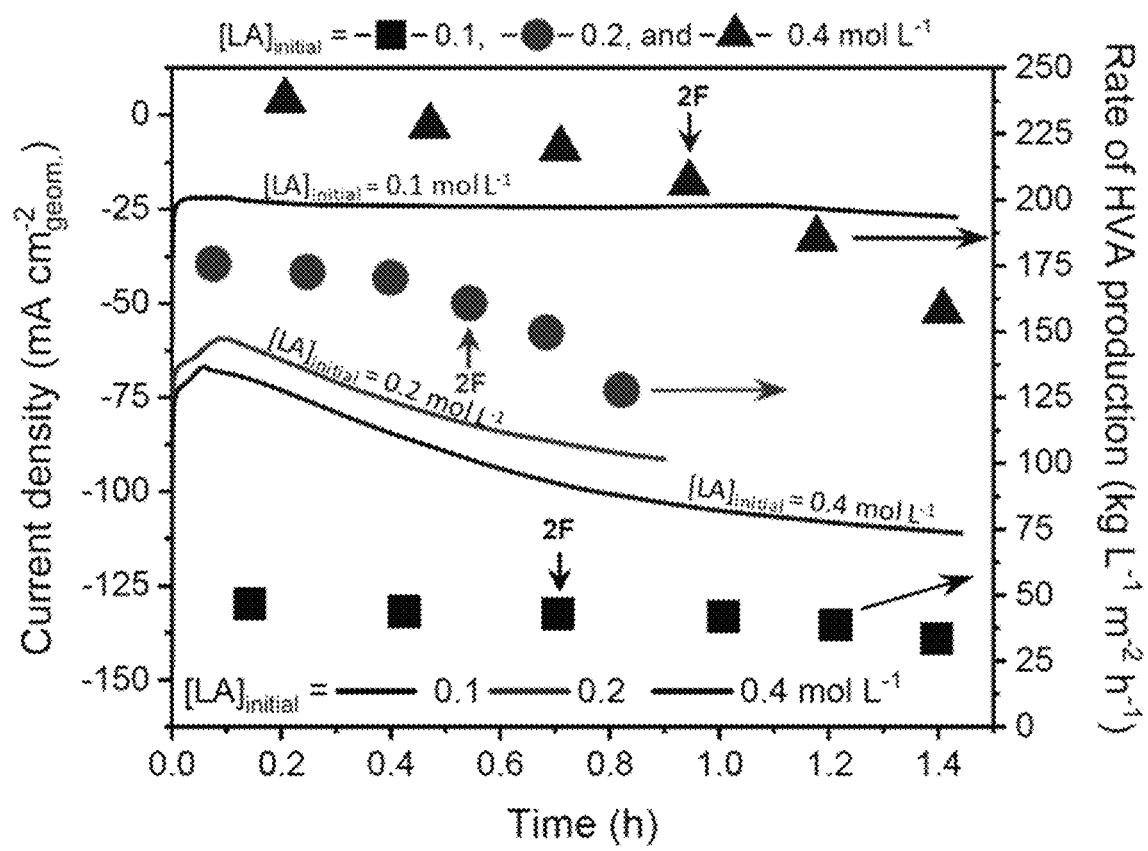
FIG. 8. Effect of initial concentration of levulinic acid ($[LA]_{initial}$). Current density and rate of 4-hydroxyvaleric acid production as a function of time for $[LA]_{initial}$=0.1 mol $L^{-1}$, 0.2 mol $L^{-1}$, and 0.4 mol $L^{-1}$ during electrolyses carried out in 0.1 M $KHCO_3$+0.1 M $KClO_4$, at −1.9 V vs. RHE and 50° C. (batch reaction rates based on the electrode geometric area and reactor size).

Finally, having roughly optimized the other operating conditions to produce 4-hydroxyvaleric acid, the effects of the initial concentration of levulinic acid ($[LA]_{initial}$) were investigated to see if the rate of 4-hydroxyvaleric acid production could be further improved. Electrolyses were carried out on 0.1, 0.2, and 0.4 M levulinic acid (close to the solubility limit of potassium levulinate) solutions at 50° C. The production of 4-hydroxyvaleric acid (quantified by HPLC) was followed after passing electric charges of 0.5, 1.0, 1.5, 2.0, 2.5, and 3.0 F/mol of levulinic acid. Just as a proof of concept, it was also found that the consumption of levulinic acid could be followed by simple in-line UV-vis spectrometry (cf. methodology in Supporting Information, FIG. 24-FIG. 25), since this reaction has ~100% selectivity toward 4-hydroxyvaleric acid; this could be used as a simple method for operando characterization of 4-hydroxyvaleric acid production, even at industrial scale. The time profiles of the electrolyses are shown in FIG. 7-FIG. 8, and as could be expected, $FE_{HVA}$ increased as a function of $[LA]_{initial}$. It was also notable that even at high conversion, the faradaic efficiency remained higher for equivalent concentrations of levulinic acid—in other words: comparing the more concentrated trials at higher conversion to the less concentrated trials at lower conversion, it can be concluded that higher 4-hydroxyvaleric acid product concentration was also beneficial to the faradaic efficiency toward levulinic acid reduction. Speculatively, since coulombic effects likely prevent adsorption at this pH, the concentration effect may relate to a decrease (as conversion rises) in the transference number of the levulinate ion, for which migration and diffusion cause competing driving forces for transport to the electrode.

Thus, amongst the evaluated conditions, it was possible to achieve 4-hydroxyvaleric acid production rates from ~40 (for $[LA]_{initial}$=0.1 mol $L^{-1}$) to ~200 kg $L^{-1}$ $m^{-2}_{geom.}$ $h^{-1}$ (for $[LA]_{initial}$=0.4 mol $L^{-1}$) with conversion above 75% while maintaining an $FE_{HVA}$ of 70-85% (stopping at 2F/mol of levulinic acid). Taking into account the reactor geometry (0.01 L divided-electrochemical reactor with electrode area/reactor volume (A/V) ratio of 0.02 $m^2$ $L^{-1}$), this maximum rate of 200 kg $L^{-1}$ $m^{-2}_{geom.}$ $h^{-1}$ (obtained with conversion and $FE_{HVA}$ of 85% for $[LA]_{initial}$=0.4 mol $L^{-1}$) gives a titer of 40 g $L^{-1}$ in one hour. This rate is more than nine times higher than that obtained for the most efficient reported biochemical methods [19,20,27,28] and could be further increased by optimizing the mass transport and reactor A/V ratio.

Figure 9:
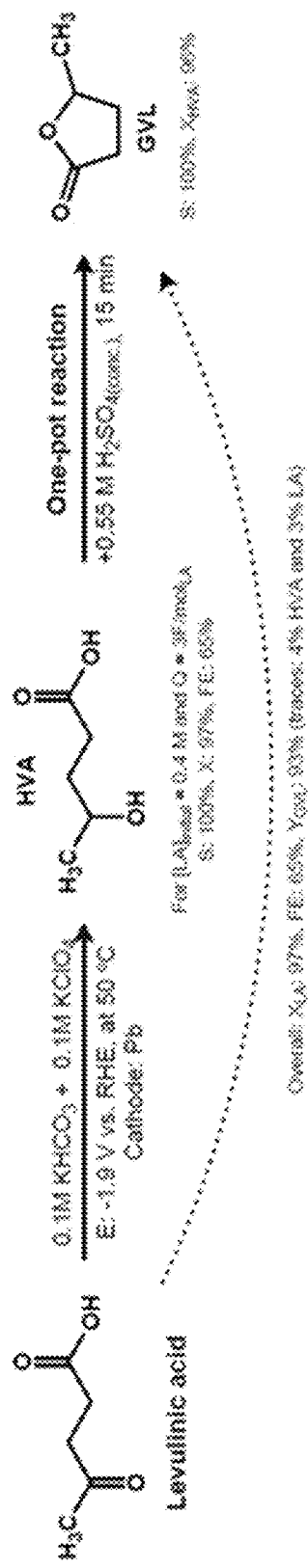
FIG. 9. One-pot electrochemical-chemical method of upgrading levulinic acid into γ-valerolactone.
Figure 26:
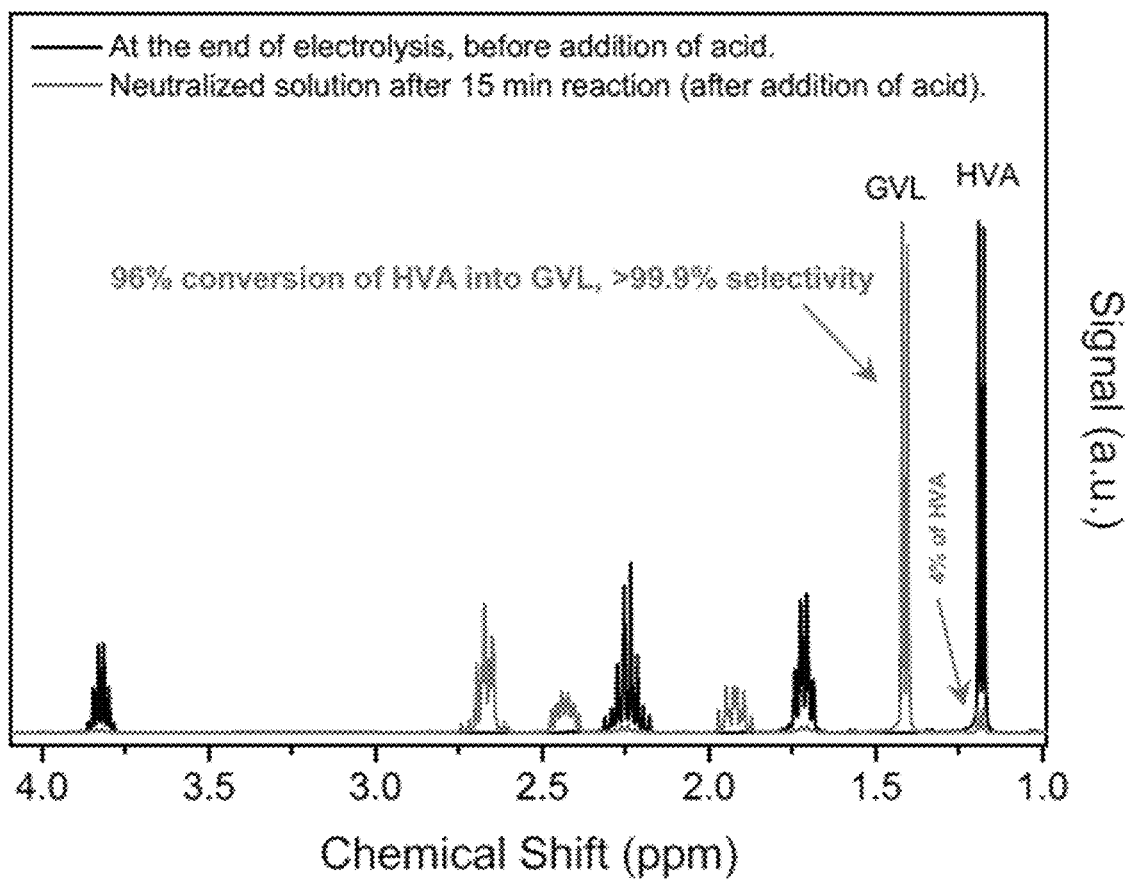
FIG. 26. $^1H$ NMR spectra for conversion of 0.39 mol $L^{-1}$ 4-hydroxyvaleric acid (obtained from the electrochemical reduction of 0.4 mol $L^{-1}$ levulinic acid at optimized conditions) into γ-valerolactone via an acid-catalyzed intramolecular esterification reaction.

Conversion of 4-hydroxyvaleric acid to γ-valerolactone. Given the new route to make 4-hydroxyvaleric acid efficiently, a one-pot electrochemical-chemical method of conversion of 4-hydroxyvaleric acid into γ-valerolactone is proposed as an alternative method of upgrading levulinic acid into γ-valerolactone under aqueous conditions. Using the electrolysis carried out with $[LA]_{initial}$=0.4 mol $L^{-1}$ and 3 F/mol$_{LA}$ (which gives 97% conversion, faradaic efficiency of 65%, and 4-hydroxyvaleric acid production rate of ~32 g $L^{-1}$ $h^{-1}$), a fast method of converting 4-hydroxyvaleric acid into γ-valerolactone was found by simply adding 30 μL of $H_2SO_4$ per mL of electrolyte (resulting in 0.55 M), as depicted in FIG. 9. As can be seen by $^1$H-NMR (FIG. 26), in 15 min, 96% of 4-hydroxyvaleric acid was converted into γ-valerolactone with >99.9% selectivity. The resulting 0.37 mol $L^{-1}$ γ-valerolactone solution contains only 4 mol % 4-hydroxyvaleric acid and 3 mol % levulinic acid as impurities, illustrating this as a promising method of upgrading levulinic acid to γ-valerolactone. Up to now, the most efficient aqueous electrochemical method for producing γ-valerolactone from levulinic acid shows only 75% selectivity with $FE_{GVL}$ and conversion of 20% and 25%, respectively [15]. It may be noted that conventional thermochemical methods of levulinic acid hydrogenation to γ-valerolactone generally involve high temperature and hydrogen pressure (70-270° C., and 0.5-150 mPa, respectively) and different precious metal-based catalysts (commonly Ru or Pt-based materials) [46-48].

Conclusion. The impacts of pH, potential, temperature, cations, and concentration of reactant were studied to understand their influence on the selectivity and efficiency of electrochemical levulinic acid reduction (LAR). At very acidic conditions, the formation of valeric acid (VA) and γ-valerolactone (GVL) occur through surface-mediated and acid-catalyzed steps, while 4-hydroxyvaleric acid (HVA) is formed via an outer sphere electron transfer (OSET) route at higher pH (above the pKa of levulinic acid), with possible participation of a parallel electromediation path involving PbH$_2$. The pH-dependent charge states of the reactant molecule, coupled to possible collective effects of other evaluated parameters on double-layer structure, solvent dynamics, and side reactions (hydrogen evolution reaction, implantation, and hydride formation), led to a maximum faradaic efficiency for 4-hydroxyvaleric acid production-amongst the tested conditions-being achieved at near-neutral pH, large negative potentials (staying above Pb cathodic corrosion limits), elevated temperature and reactant concentration, and in the presence of $K^+$ ions. An 4-hydroxyvaleric acid production rate higher than 40 g $L^{-1}$ $h^{-1}$ with >99.9% selectivity, and conversion and faradaic efficiency both above 80% were shown. The rate is more than nine times higher than the highest recorded biochemical methods. Finally, an easy one-pot synthetic method to convert 4-hydroxyvaleric acid into γ-valerolactone with 100% selectivity and 96% conversion was also demonstrated.

Supporting Information

Products Identification and Quantification. Products of electrolysis were identified and quantified by liquid chromatography (LC) and $^1$H NMR. Liquid chromatography analyses were performed in an Advion 2000 HPLC equipped with a 300 mm×6.5 mm sulfonated polystyrene gel column (Hi-Plex H, Agilent, which is well-suited for the analysis of biomass-derived oxygenated compounds), as well as a UV diode array detector (DAD) and Advion Expression Compact Mass Spectrometer (S Series). A Bruker AVANCE-III 400 MHz NMR spectrometer was used for $^1$H NMR analyses.

Figure 10:
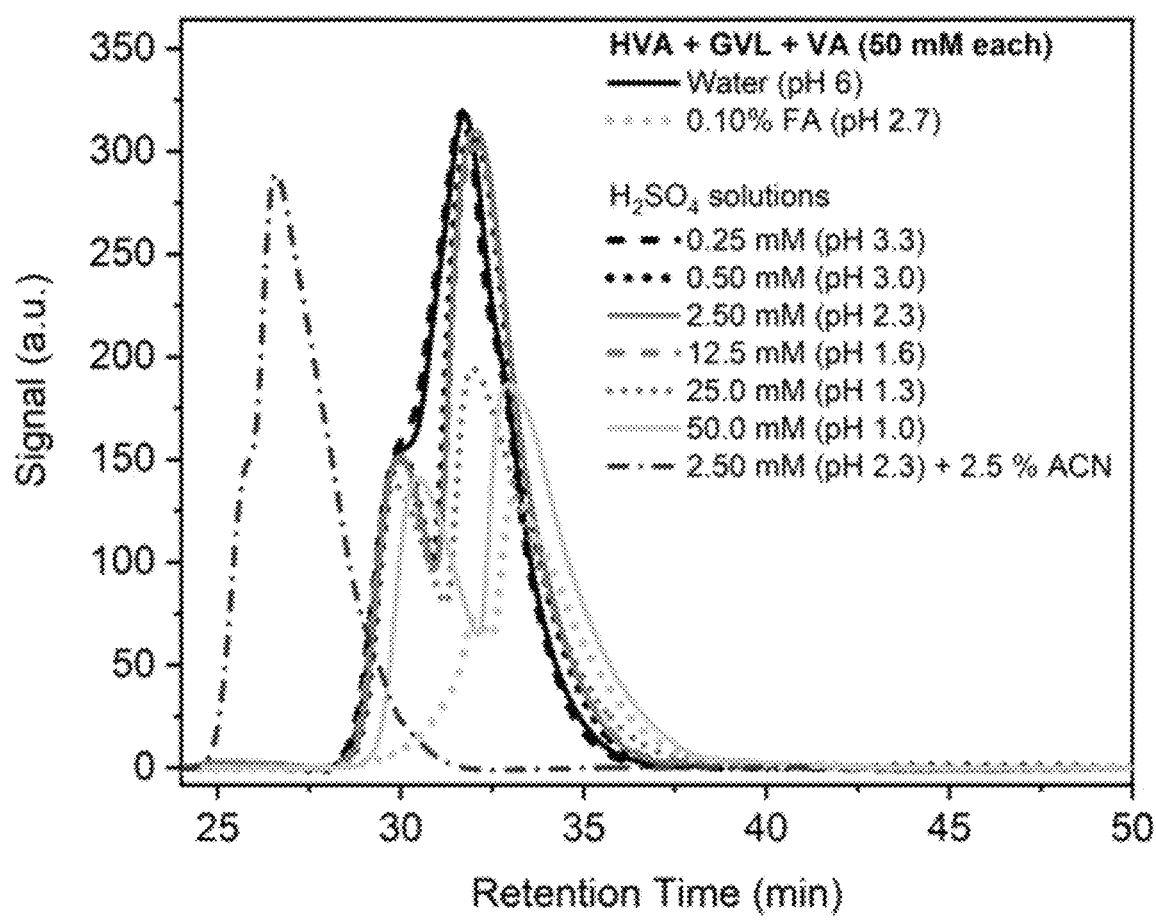
FIG. 10. Chromatograms for a mixture of 50 mM levulinic acid, valeric acid, γ-valerolactone, and 4-hydroxyvaleric acid, using UV detector at 210 nm and column temperature of 60° C. Eluent effect: flow rate of 0.4 mL $min^{-1}$ and different eluents.
Figure 11:
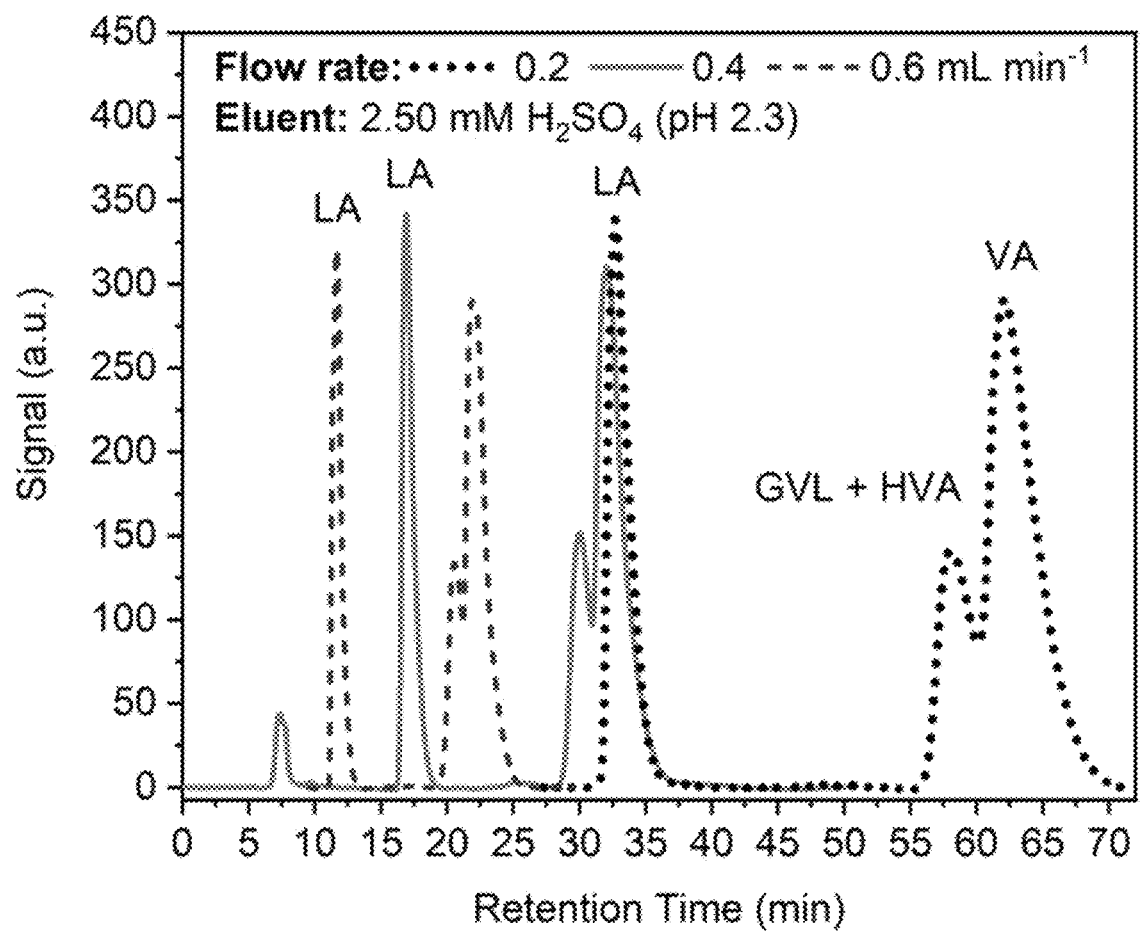
FIG. 11. Chromatograms for a mixture of 50 mM levulinic acid, valeric acid, γ-valerolactone, and 4-hydroxyvaleric acid, using UV detector at 210 nm and column temperature of 60° C. Flow rate effect: 2.50 mM $H_2SO_4$ as eluent and flow rates of 0.2, 0.4, and 0.6 mL $min^{-1}$.
Figure 12:
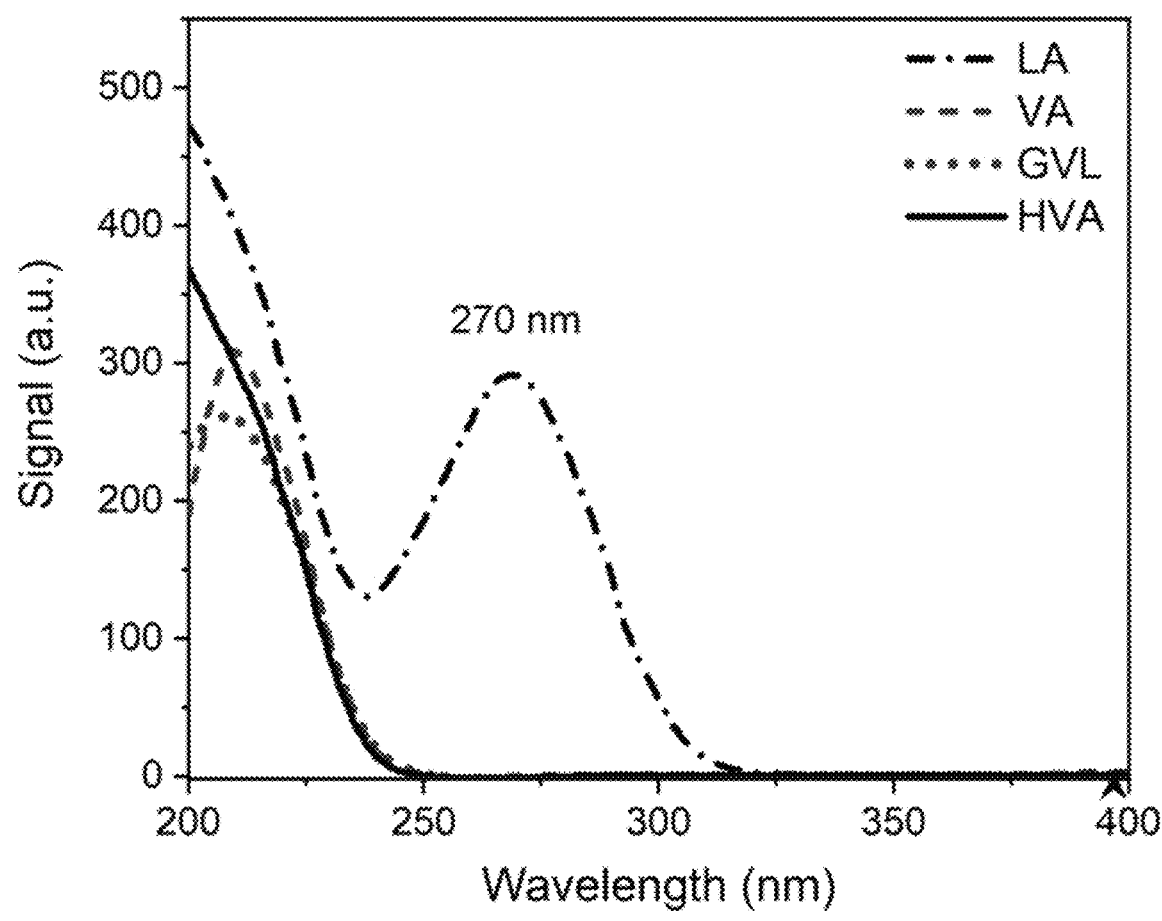
FIG. 12. UV-vis spectra for levulinic acid, valeric acid, γ-valerolactone and 4-hydroxyvaleric acid.
Figure 13:
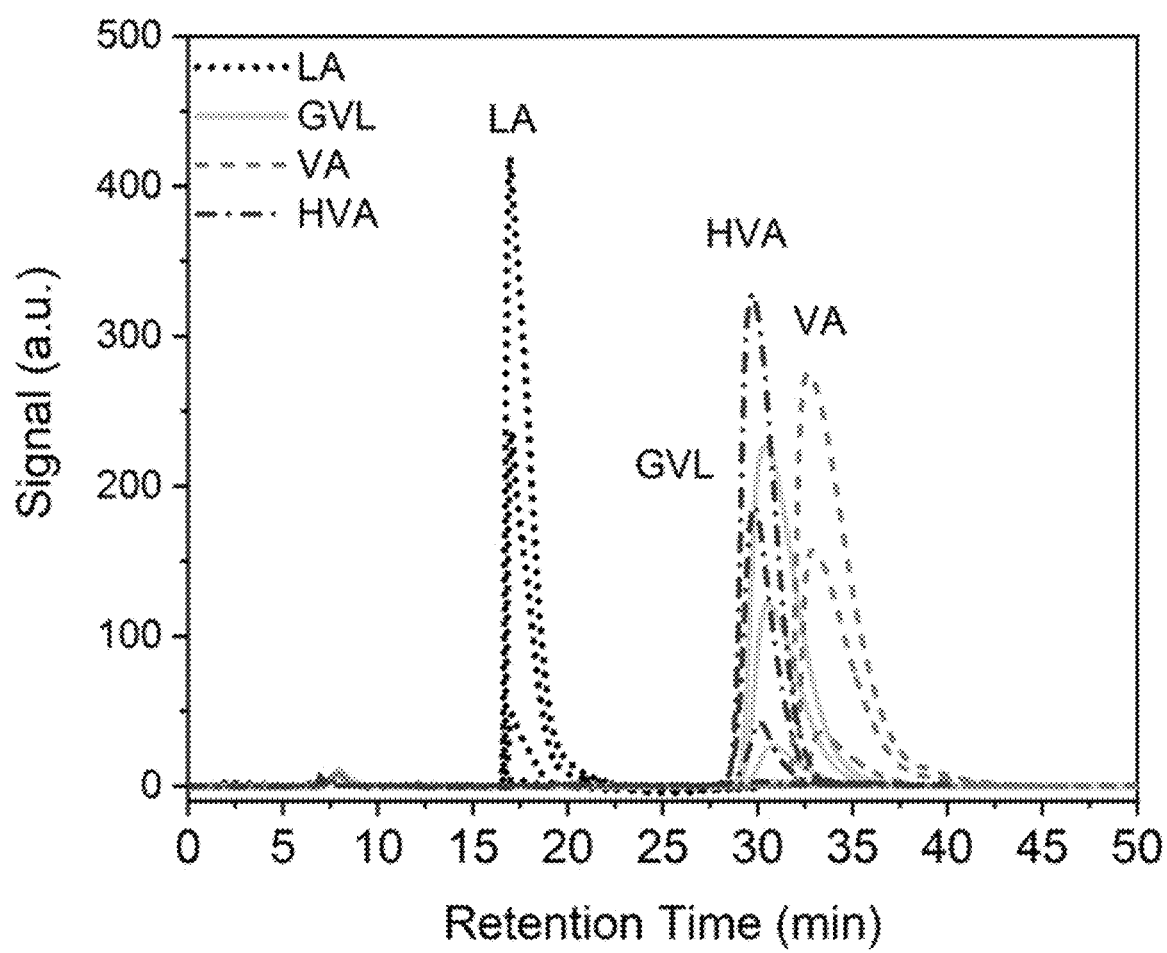
FIG. 13. Chromatograms for different concentrations of levulinic acid, valeric acid, γ-valerolactone, and 4-hydroxyvaleric acid, using UV detector at 210 nm, column temperature of 60° C., flow rate of 0.4 mL $min^{-1}$, and 12.5 mM $H_2SO_4$ as eluent.

Liquid chromatography method. A liquid chromatography method was developed for the identification and quantification of levulinic acid (LA), valeric acid (VA), γ-valerolactone (GVL), and 4-hydroxyvaleric acid (HVA). The separation between valeric acid, γ-valerolactone, and 4-hydroxyvaleric acid is the most challenging (as can be seen in FIG. 10-FIG. 12). Evaluating the effect of mobile phase pH, it was concluded that a good separation between γ-valerolactone+4-hydroxyvaleric acid (together) and valeric acid is reached at pH below 2.3. The addition of organic solvent (e.g., 2.5 vol. % acetonitrile, ACN) makes the separation worse, and the column temperature and flow rate just affect the retention time of these compounds (lower retention time for higher temperature or flow rate, as expected), not impacting the separation (e.g., FIG. 11). Thus, 12.5 mM $H_2SO_4$ was chosen as the optimized eluent, and the flow rate and column temperature were set to 0.4 mL min$^{-1}$ (which is the maximum flow rate allowable for the mass spectrometry detector and also gives reasonable retention times) and 60° C. (the highest operating temperature for the column). Based on the UV spectra of these compounds (FIG. 12), a wavelength of 210 nm was selected for quantification. At these conditions, levulinic acid showed a retention time of ~16.8 min, while γ-valerolactone+4-hydroxyvaleric acid was ~29.7 min, valeric acid was 32.8 min, and the "dead-time" (supporting electrolyte retention time) was at about 7.5 min (FIG. 13). While γ-valerolactone and 4-hydroxyvaleric acid could not be separated, independent evaluation of mixtures was performed by $^1$H-NMR analyses and mass spectrometry (MS), as will be shown below. For neutral-to-alkaline conditions that reliably produced pure 4-hydroxyvaleric acid, the liquid chromatography method was deemed adequate for 4-hydroxyvaleric acid quantification.

Figure 14:
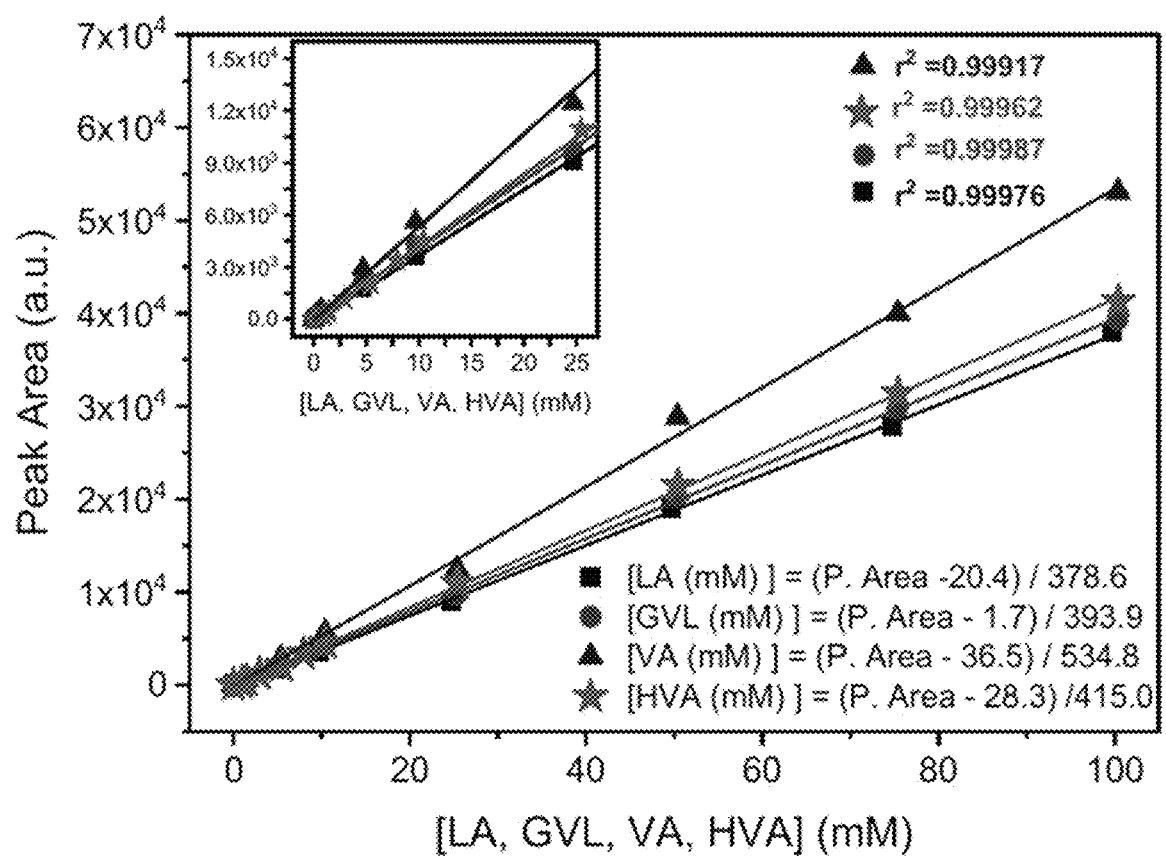
FIG. 14. Calibration curves for levulinic acid, valeric acid, γ-valerolactone, and 4-hydroxyvaleric acid.

Using the developed liquid chromatography method and ultrapure chemicals (with purity analyzed by $^1$H-NMR), external calibration curves were made from standard solutions prepared in pure water, as can be seen in FIG. 14.

Sample preparation for liquid chromatography analyses: 2 mL aliquots were collected from the electrolyte at the end of electrolyses and filtered through a 0.2 μm hydrophilic PTFE membrane (Millipore) into amber liquid chromatography-vials. When using the mass spectrometry detector, the eluent was diverted for the first 15 min of the run to avoid the introduction of supporting electrolyte salts to the ion source. Before analyses, this detector was calibrated with an electrospray ionization tuning mixture (Agilent Technologies). The molecular mass (molecular ion) of the compounds was identified using positive electrospray ionization (ESI+), with a capillary temperature and voltage of 250° C. and 120 V, respectively, electrospray ionization voltage of 3500 V, and ultrapure $N_2$ at a flow rate of 4 L/min as ion/gas source.

Figure 15:
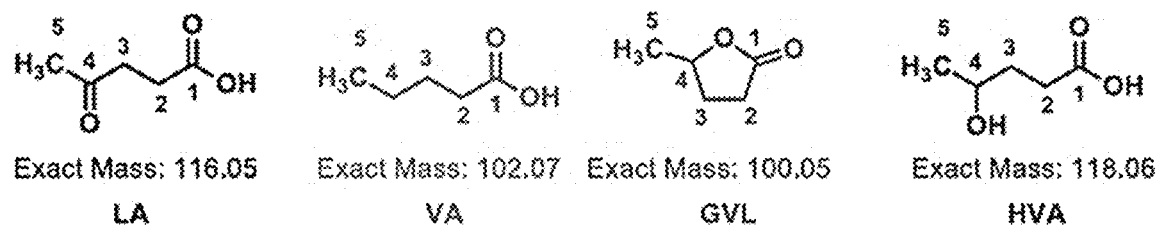
FIG. 15. Top: Chemical structures of levulinic acid (LA), valeric acid (VA), γ-valerolactone (GVL), and 4-hydroxyvaleric acid (HVA), and their respective exact masses. Bottom: $^1$H-NMR spectra for these compounds. The "*" peaks represent those used for the analytical quantification of these compounds in a mixture.
Figure 15:
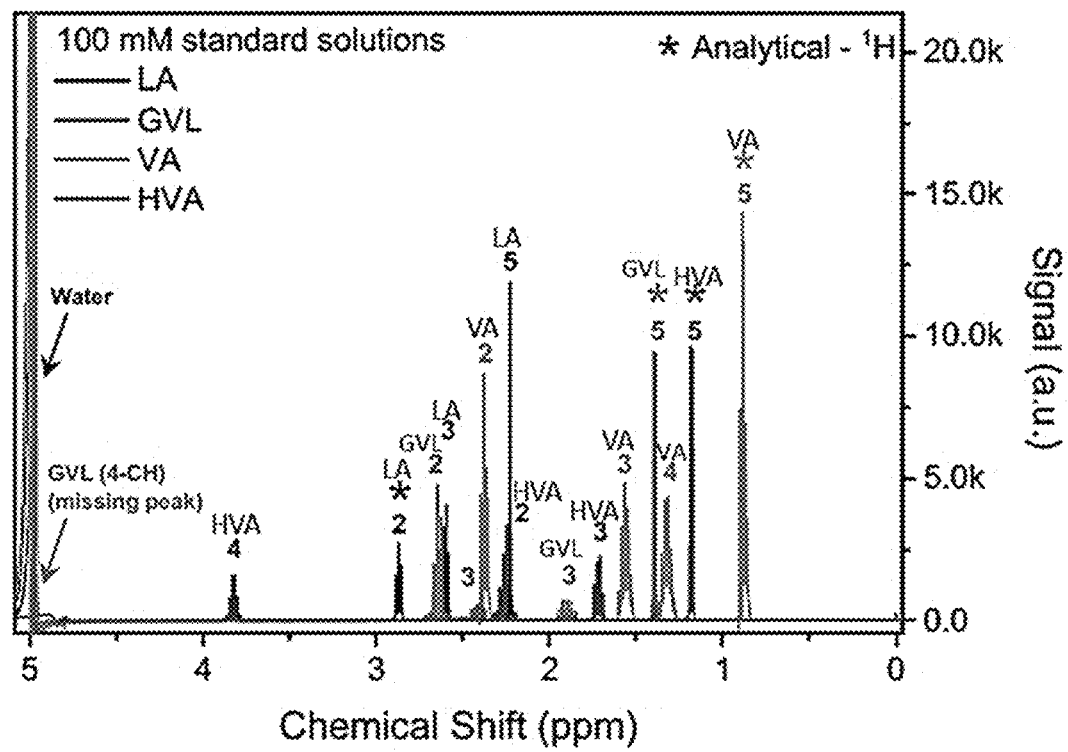

NMR method. The chemical and analytical distinction between γ-valerolactone and 4-hydroxyvaleric acid (and also valeric acid and levulinic acid) was based on chemical shift signature and mass fragmentation of their $^1$H NMR and mass spectra, respectively. As can be seen in FIG. 15, 4-hydroxyvaleric acid and γ-valerolactone have very distinct NMR signatures. At the top part of this figure, the chemical structures of levulinic acid, valeric acid, γ-valerolactone, and 4-hydroxyvaleric acid are shown; the carbon atoms were numbered to help the correlation with their NMR spectrum, and respective exact masses are also shown.

Levulinic acid $^1$H NMR spectrum (400 MHz, H$_2$O+10 w. % D$_2$O, water suppression): δ 2.87 (t, 2H), 2.60 (t, 2H), 2.23 (s, 3H) ppm.

Valeric acid $^1$H NMR spectrum (400 MHz, H$_2$O+10 w. % D$_2$O, water suppression): δ 2.38 (t, 2H), 1.56 (quintet, 2H), 1.32 (sextet, 2H), 0.88 (t, 3H) ppm.

γ-Valerolactone $^1$H NMR spectrum (400 MHz, H$_2$O+10 w. % D$_2$O, water suppression): δ 4.84 (sextet, 1H, suppressed under H$_2$O signal), 2.65 (m, 2H), 2.41 (m, 1H), 1.90 (m, 1H), 1.39 (d, 3H) ppm.

4-Hydroxyvaleric acid $^1$H NMR spectrum (400 MHz, H$_2$O+10 w. % D$_2$O, water suppression): δ 3.82 (sextet, 1H), 2.25 (m, 2H), 1.90 (m, 2H), 1.39 (d, 3H) ppm.

Sample preparation for NMR analyses: 450 μL aliquots were collected from the electrolyte and mixed with 50 μL of D$_2$O (with 0.05 wt. % TMSP, used as internal reference and standard for quantification).

Defining Equations for Selectivity, faradaic efficiency, and Conversion. Because levulinic acid is a viscous liquid compound, the correspondent quantity of compound used for each electrolyses was weighed (instead of volumetrically measured), and the total charge used for each electrolysis was calculated based on the following equation:

$$Q_T(C) = \frac{n_p \cdot m_{LA} \cdot F}{MW_{LA}} \therefore Q_T(C) = n \cdot F/\text{mol of } LA \qquad \text{Eq. S1}$$

where, $n_p$ is the number of electrons used for the reduction of levulinic acid to valeric acid (4e$^-$), γ-valerolactone (2e$^-$), or 4-hydroxyvaleric acid (2e$^-$), mA the exact mass (in grams) of levulinic acid dissolved in the cathodic supporting electrolyte, F the Faraday constant (96485 C mol$^{-1}$), and MW$_{LA}$ the levulinic acid molecular weight (116.12 g mol$^{-1}$). The faradaic efficiency (FE) for each product was then calculated as:

$$FE(\%)_{VA, GVL, or HVA} = \frac{n_p \cdot C_P \cdot V_{S.E.} \cdot F}{Q_T} \qquad \text{Eq. S2}$$

where, in addition to previous notation, $C_P$ is concentration (mol L$^{-1}$) of the individual product, and $V_{S.E.}$ is the volume of supporting electrolyte (0.01 L).

Since most of electrolyses showed close to 100% mass balance and 1 mol of levulinic acid can produce 1 mol of valeric acid, γ-valerolactone, and/or 4-hydroxyvaleric acid, levulinic acid conversion (X %) was computed as:

$$X(\%) = \frac{(C_{VA} + G_{GVL} + C_{HVA}) \cdot 100}{C_{LA-initial}} \cong \frac{C_{LA-final} \cdot 100}{C_{LA-initial}} \qquad \text{Eq. S3}$$

where, $C_{LA-initial}$ and $C_{LA-final}$ are the initial and final concentrations of levulinic acid, respectively, and $C_{VA}$, $C_{GVL}$, and $C_{HVA}$ are the concentrations of valeric acid, γ-valerolactone, and 4-hydroxyvaleric acid, respectively.

Thus, using equations S1-S3, the selectivity for individual products can be calculated with Equation S4.

$$S(\%)_{VA, GVL, or HVA} = \qquad \text{Eq. S4}$$
$$\frac{C_{VA, GVL, or HVA} \cdot 100}{C_{VA} + C_{GVL} + C_{HVA}} = \frac{(FE_{VA} \text{ or } 2 \cdot FE_{GVL} \text{ or } 2 \cdot FE_{HVA})}{FE_{VA} + 2 \cdot FE_{GVL} + 2 \cdot FE_{HVL}}$$

Homogeneous hydrolysis of γ-valerolactone. Extra non-electrochemical control experiments were used to verify if γ-valerolactone can be hydrolyzed to 4-hydroxyvaleric acid under experimental conditions used for these electrolyses. For this study, 0.1 mol L$^{-1}$ γ-valerolactone solutions in different supporting electrolytes [0.5 mol L$^{-1}$ H$_2$SO$_4$ (pH 0), pure H$_2$O (pH 7), 0.1 mol L$^{-1}$ KHCO$_3$+0.1 mol L$^{-1}$ KClO$_4$ (pH 7), and in 0.1 mol L$^{-1}$ KOH (pH 13)], kept at 50° C. for 3 h (higher temperature and longer time than those used in any of the electrolyses), and afterward analyzed by $^1$H NMR, are shown in FIG. 19. Conversion rates of 2.5, 0.0, 3.8, and 6.7×10$^{-3}$ mol L$^{-1}$ h$^{-1}$ (i.e. 7.4, 0.0, 11.5, and 20.0 mol % in 3 h) were observed for hydrolysis of γ-valerolactone to 4-hydroxyvaleric acid in these different solutions, respectively. Given the low formation rate of 4-hydroxyvaleric acid relative to electrolysis, it can be concluded that 4-hydroxyvaleric acid is not formed from homogenous hydrolysis of γ-valerolactone.

Figure 24:
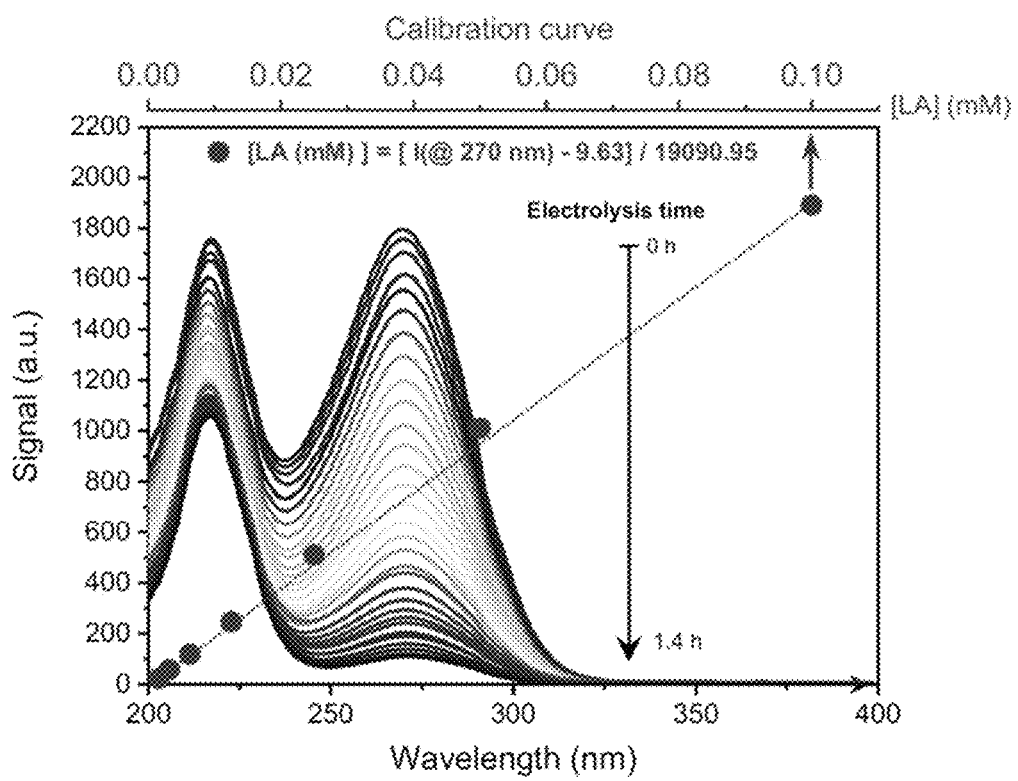
FIG. 24. Top scale: Calibration curve for levulinic acid using the peak signal intensity at 270 nm. Bottom scale: UV-vis spectra, at different electrolysis times, for electrolyte recirculated from the electrochemical cell under operando electrolysis (carried out in 0.1 M $KHCO_3$+0.1 M $KClO_4$ at 50° C., −1.9 V vs. RHE, and for $[LA]_{initial}$=0.1 mol $L^{-1}$) through the UV-vis cell at 1 mL $min^{-1}$.
Figure 25:
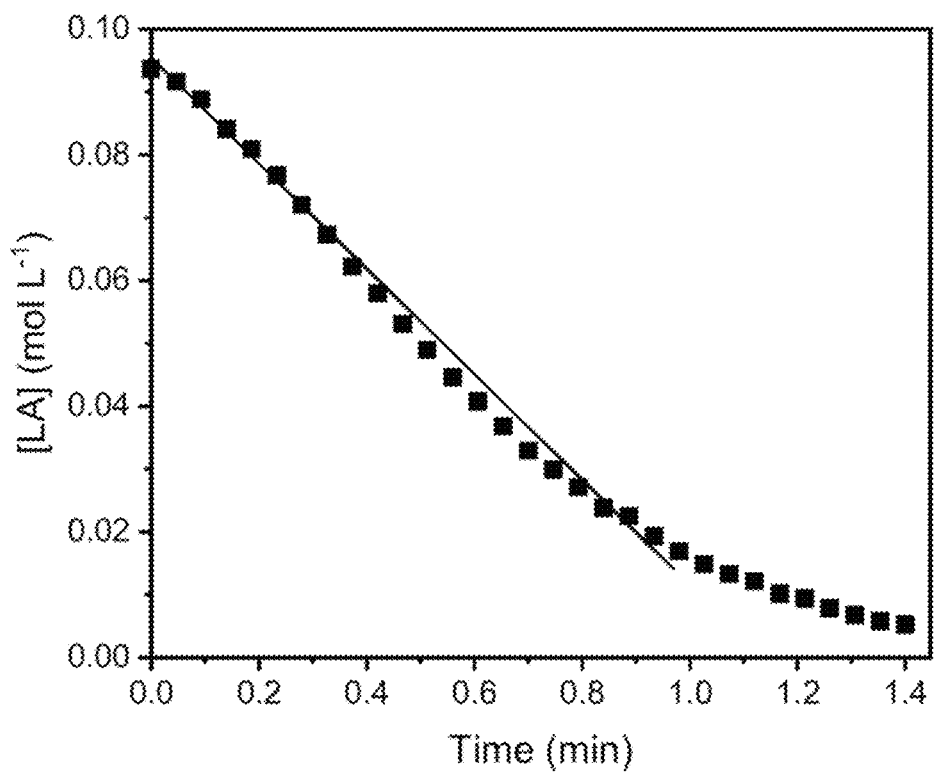
FIG. 25. Concentration of levulinic acid (LA) as a function of electrolysis time obtained from spectra of FIG. 24.

In-line Operando Quantification of Levulinic Acid Conversion. Levulinic acid conversion into products can be followed by in-line UV-vis, since only levulinic acid absorbs at the region around 270 nm (cf. FIG. 10-FIG. 12). For this proof-of-concept experiment, electrolysis of levulinic acid (carried out in 0.1 M KHCO$_3$+0.1 M KClO$_4$ at 50° C., −1.9 V vs. RHE, and for [LA]$_{initial}$=0.1 mol L$^{-1}$) was followed by recirculating the electrolyte from/to the electrochemical cell through the micro-cell of the UV-vis detector (from HPLC system, Advion 2000 HPLC, optical path 10 mm and volume of 0.1 mL), at a flow rate of 1.0 mL min$^{-1}$, and collecting UV-vis spectra of the electrolyte (FIG. 24). A calibration curve for this experiment was obtained by recirculating known amounts of levulinic acid dissolved in supporting electrolyte and correlating the levulinic acid concentration ([LA]) with the peak intensity at 270 nm (as can be seen at the top part of FIG. 24). Thus, the levulinic acid concentration as a function of time was obtained (FIG. 25), and these results agree with those obtained from the chromatography (FIG. 7-FIG. 8).

One-pot conversion of 4-hydroxyvaleric acid into γ-valerolactone. The conversion of 4-hydroxyvaleric acid to γ-valerolactone can be easily carried out via an acid-catalyzed intramolecular esterification reaction. As a proof-of-concept, 300 μL of H$_2$SO$_4$ was added to 10 mL of 0.39 mol L$^{-1}$ 4-hydroxyvaleric acid solution obtained from electrochemical reduction of levulinic acid carried out from 0.4 mol L$^{-1}$ levulinic acid, with 3F/mol$_{LA}$ at −1.9 V vs. RHE (which gives 97% conversion, faradaic efficiency of 65%, and 4-hydroxyvaleric acid production rate of ~32 g L$^{-1}$ h$^{-1}$). The acid was added immediately after the electrolysis was completed, and the solution was kept stirring at the same temperature (50° C.) for 15 min, before being neutralized with 0.55 M K$_2$CO$_3$ for $^1$H-NMR analysis. A sample was collected before the addition of acid. As can be seen in $^1$H-NMR spectra shown in FIG. 26, 96% of 4-hydroxyvaleric acid was converted into γ-valerolactone with >99.9% selectivity, illustrating this as a promising one-pot electrochemical-chemical method of upgrading levulinic acid into γ-valerolactone.

REFERENCES

1. Holladay J E et al. *Top value-added chemicals from biomass, Volume II—Results of Screening for Potential Candidates From Biorefinery Lignin*, 2007.

2. Signoretto M et al. *Molecules*, 2019, 24, 2760.
3. Meramo Hurtado S I et al. *ACS Omega*, 2021, 6, 5627-5641.
4. Kang S et al. *Renewable and Sustainable Energy Reviews*, 2018, 94, 340-362.
5. Hayes G C et al. *Polymer Chemistry*, 2020, 11, 4068-4077.
6. Pileidis F C et al. *ChemSusChem*, 2016, 9, 562-582.
7. Du Y et al. *Catalysts*, 2020, 10, 692.
8. Wu H et al. *Chemical Science*, 2019, 10, 1754-1759.
9. Frontana-Uribe B A et al. *Green Chemistry*, 2010, 12, 2099.
10. Hammerich O et al. *Organic Electrochemistry: Revised and Expanded, Fifth Edition.*, CRC Press, Boca Raton, FL, 5th edn., 2016.
11. Grimshaw J, *Electrochemical Reactions and Mechanisms in Organic Chemistry*, Elsevier, Belfast, 2000, vol. 124.
12. Botte G G, *Interface magazine*, 2014, 23, 49-55.
13. Lucas F W S et al. *ACS Energy Letters*, 2021, 1205-1270.
14. Xin L et al. *ChemSusChem*, 2013, 6, 674-686.
15. dos Santos T R et al. *RSC Advances*, 2015, 5, 26634-26643.
16. Qiu Y et al. *Green Chem.*, 2014, 16, 1305-1315.
17. Bisselink R J M et al. *ChemElectroChem*, 2019, 6, 3285-3290.
18. Nilges P et al. *Energy Environ. Sci.*, 2012, 5, 5231-5235.
19. Yeon Y J et al. *Journal of Biotechnology*, 2015, 210, 38-43.
20. Sathesh-Prabu C et al. *J. of Agricultural and Food Chem.*, 2019, 67, 2540-2546.
21. Steinbüchel A, in *Biotechnology Set*, Wiley, 2001, pp. 403-464.
22. Ashby R D et al. *Bioresource Technology*, 2012, 118, 272-280.
23. Furrer P et al., in *Natural-Based Polymers for Biomedical Applications*, Elsevier, 2008, pp. 416-445.
24. Braunegg G et al. *Journal of Biotechnology*, 1998, 65, 127-161.
25. Research and Markets, Global Bioplastics & Biopolymers Market Outlook 2020-2025, https://www.globenewswire.com/news-release/2020/04/17/2017839/0/en/Global-Bioplastics-Biopolymers-Market-Outlook-2020-2025.html, (accessed Apr. 22, 2021).
26. Goonoo N et al. *Journal of Biomedical Materials Research Part B: Applied Biomaterials*, 2017, 105, 1667-1684.
27. Gabirondo E et al. *Polymer Chemistry*, DOI:10.1039/D0PY00088D.
28. Ganesh Saratale R et al. *Bioresource Technology*, 2021, 124685.
29. Kim D et al. *Journal of Agricultural and Food Chemistry*, 2019, 67, 10678-10684.
30. Yeon Y J et al. *Bioresource Technology*, 2013, 134, 377-380.
31. Miyake H et al. *Electrochemistry Communications*, 2002, 4, 973-977.
32. Lucas F W S et al. *ChemElectroChem*, 2020, 7, 3733-3742.
33. Bondue C J et al. *Journal of Catalysis*, 2019, 369, 302-311.
34. Martin E L, in *Organic Reactions*, John Wiley & Sons, Inc., Hoboken, NJ, USA, 2011, pp. 155-209.
35. Argade S D et al. in *Electrosorption*, Springer U S, Boston, M A, 1967, pp. 87-115.
36. Strmcnik D et al. *Nature Chemistry*, 2013, 5, 300-306.
37. Wang X et al. *Nature Communications*, 2019, 10, 4876.
38. Kabanov B N et al. *Russian Chemical Reviews*, 1965, 34, 775-785.
39. Salzberg H W., *Journal of The Electrochemical Society*, 1953, 100, 146.
40. Gastwirt L W et al. *Journal of The Electrochemical Society*, 1957, 104, 701.
41. Frumkin A et al. *Electrochimica Acta*, 1970, 15, 289-301.
42. Pourbaix M., *Atlas of Electrochemical Equilibria in—Aqueous Solutions*, National Association of Corrosion Engineers & International Cebelcor, Houston, Texas, Second Eng., 1974.
43. Ledezma-Yanez I et al. *Nature Energy*, 2017, 2, 17031.
44. Grahame D C, *Journal of The Electrochemical Society*, 1951, 98, 343.
45. Huang B et al. *The Journal of Physical Chemistry C*, 2021, acs.jpcc.0c10492.
46. Danilovic N et al. *Electrocatalysis*, 2012, 3, 221-229.
47. Lide D R et al. *Journal of the American Chemical Society*, 2009, 131, 12862-12862.
48. Koley P et al. *Fuel*, 2021, 289, 119900.
49. Xu Y et al. *Current Green Chemistry*, 2020, 7, 304-313.
50. Xu R et al. *ChemSusChem*, 2020, 13, 6461-6476.
51. Zebardast H R et al. *J. Electroanal. Chem.* 2014, 724, 36-42.0.

Example 2—Electrochemical synthesis of hydroxyvaleric acid from levulinic acid

Described herein is a synthetic route to produce renewable hydroxyvaleric acid (HVA), which is a valuable monomer for the production of bio-compatible plastics. The process takes levulinic acid (LA, a molecule that is derived from lignocellulosic biomass) and exposes it to electrochemical conditions that convert the molecule to hydroxyvaleric acid with high selectivity and yield.

Conventional hydroxyvaleric acid production is done by biochemical routes that are much slower and less efficient.

Electrochemical reduction of levulinic acid to other products has been shown, but hydroxyvaleric acid has never before been reported as a major product, and the reaction conditions herein have been engineered to produce this product with nearly 100% selectivity from levulinic acid.

Key components include:
(i) Engineering compatible combinations of electrode material and electrolyte composition to suppress parasitic reactions including hydrogen evolution, as well as excessive ion implantation and metal hydride formation that can yield cathodic corrosion of the electrode itself, and
(ii) Engineering of the reaction mixture composition and electrochemical reaction cell configuration to control mass transport of reactive species and charge carriers such that local pH in the vicinity of the electrode is controlled and suppresses side reaction pathways from levulinic acid to form valeric acid and/or gamma-valerolactone (GVL).

Further, described herein is an efficiency system for gamma-valerolactone synthesis by sequential one-pot electrolysis and acid-catalyzed esterification of the electrochemically produced hydroxyvaleric acid.

The methods described herein are unprecedented and green/renewably powered synthesis of plastics which can replace petrochemicals.

Other advantages which are obvious and which are inherent to the invention will be evident to one skilled in the art.

It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method comprising electrochemical synthesis of hydroxyvaleric acid from levulinic acid, wherein the method is conducted in an electrochemical cell wherein a working electrode is in electrochemical contact with an aqueous electrolyte and levulinic acid, wherein the method comprises applying a potential to electrochemically reduce the levulinic acid to form hydroxyvaleric acid.

2. The method of claim 1, wherein the working electrode comprises Pb, Sn, In, Bi, Cd, Zn, Sb, or a combination thereof.

3. The method of claim 1, wherein the working electrode comprises Pb.

4. The method of claim 1, wherein the aqueous electrolyte has a pH of from 3 to 14.

5. The method of claim 1, wherein the method is conducted at a temperature of from 0° C. to 120° C.

6. The method of claim 1, wherein the levulinic acid has an initial concentration from greater than 0 to 0.4 mol/L.

7. The method of claim 1, wherein the aqueous electrolyte further comprises an additive, a solvent, or a combination thereof.

8. The method of claim 1, wherein the potential is from −1.1 to −1.9 V vs. RHE.

9. The method of claim 1, wherein the method further comprises applying a current density of from 1 to 2000 mA $cm^{-2}$.

10. The method of claim 1, wherein the potential is applied for an amount of time of 1 minute to 1000 minutes.

11. The method of claim 1, wherein the method produces the hydroxyvaleric acid from the levulinic acid with a selectivity of from 50 to 100%.

12. The method of claim 1, wherein the method produces the hydroxyvaleric acid from the levulinic acid with a Faradaic efficiency of from 50 to 100%.

13. The method of claim 1, wherein the method converts from 50 to 100% of the levulinic acid to the hydroxyvaleric acid.

14. The method of claim 1, wherein the method produces the hydroxyvaleric acid from the levulinic acid at a production rate of from 5 to 1000 g $L^{-1}$ $h^{-1}$.

15. The method of claim 1, wherein the method further synthesizes valeric acid, gamma-valerolactone, or a combination thereof from the levulinic acid.

16. The method of claim 1, further comprising subsequently converting the electrochemically synthesized hydroxyvaleric acid to gamma-valerolactone, wherein the method comprises electrolysis of the levulinic acid followed by acid-catalyzed esterification to form the gamma-valerolactone.

17. The method of claim 16, wherein the method:
converts from 90% to 100% of the hydroxyvaleric acid to the gamma-valerolactone;
produces the gamma-valerolactone from the hydroxyvaleric acid with a selectivity of from 90% to 100%;
produces the gamma-valerolactone with a yield of from 90 to 100%;
produces the gamma-valerolactone in an amount of time of from 1 to 120 minutes;
or a combination thereof.

18. The method of claim 1, wherein the method is a one-pot method.

* * * * *